(12) United States Patent
Miwa et al.

(10) Patent No.: US 7,680,325 B2
(45) Date of Patent: Mar. 16, 2010

(54) IMAGE PROCESSING METHOD OF DETECTING A CORRESPONDENCE BETWEEN COLORS, IMAGE PROCESSING APPARATUS AND PROGRAM FOR DETECTING A CORRESPONDENCE BETWEEN COLORS

(75) Inventors: Shinji Miwa, Hokuto (JP); Atsushi Nagahara, Chino (JP); Toshio Tanaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1106 days.

(21) Appl. No.: 10/563,563

(22) PCT Filed: May 9, 2005

(86) PCT No.: PCT/JP2005/008824

§ 371 (c)(1),
(2), (4) Date: Jan. 6, 2006

(87) PCT Pub. No.: WO2005/112433

PCT Pub. Date: Nov. 24, 2005

(65) Prior Publication Data

US 2006/0165280 A1    Jul. 27, 2006

(30) Foreign Application Priority Data

May 17, 2004  (JP)  ............................. 2004-146429
Jun. 16, 2004  (JP)  ............................. 2004-178387

(51) Int. Cl.
*G06K 9/00* (2006.01)
*G06K 9/46* (2006.01)
*G03F 3/08* (2006.01)

(52) U.S. Cl. ..................................... 382/167; 382/190
(58) Field of Classification Search ................ 382/162, 382/164, 167, 190, 218, 219, 174; 358/1.9, 358/1.13, 3.26, 447, 500, 515, 518, 520, 358/522; 348/252, 577, 586, E5.067, E9.037
See application file for complete search history.

(56) References Cited

U.S. PATENT DOCUMENTS

| | | | |
|---|---|---|---|
| 4,907,071 A | | 3/1990 | Belmares-Sarabia et al. |
| 5,157,483 A | * | 10/1992 | Shoji et al. .................. 358/515 |
| 5,212,546 A | | 5/1993 | Arazi et al. |
| 6,108,441 A | | 8/2000 | Hiratsuka et al. |
| 6,456,323 B1 | * | 9/2002 | Mancuso et al. ......... 348/218.1 |
| 6,819,439 B2 | * | 11/2004 | Hayashi et al. ............. 358/1.13 |
| 6,882,447 B1 | * | 4/2005 | Nakajima et al. ............ 358/1.9 |
| 7,042,602 B1 | | 5/2006 | Yang et al. |
| 7,177,469 B2 | * | 2/2007 | Kagawa et al. ............... 382/167 |
| 2006/0165280 A1 | * | 7/2006 | Miwa et al. ................. 382/167 |

FOREIGN PATENT DOCUMENTS

| JP | A 07-121681 | 5/1995 |
|---|---|---|
| JP | A 09-147098 | 6/1997 |

(Continued)

*Primary Examiner*—Amir Alavi
(74) *Attorney, Agent, or Firm*—Oliff & Berridge, PLC

(57) ABSTRACT

An image processing method has a detection step of detecting a correspondence between one color of a first plurality of colors in a first image and one color of a second plurality of colors in a second image, and a correction step of correcting the first plurality of colors or the second plurality of colors in accordance with the correspondence.

17 Claims, 14 Drawing Sheets

FOREIGN PATENT DOCUMENTS

| | | |
|---|---|---|
| JP | A 09-186907 | 7/1997 |
| JP | A 09-298657 | 11/1997 |
| JP | A 2000-013628 | 1/2000 |
| JP | A-2000-348170 | 12/2000 |
| JP | A 2002-290758 | 10/2002 |
| WO | WO 01/15409 A2 | 3/2001 |

* cited by examiner

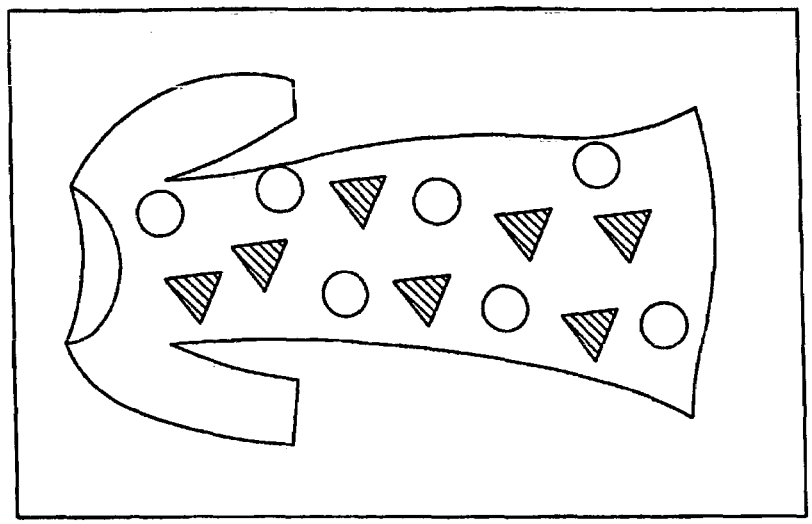
FIG. 3B3  SECOND IMAGE 30a3
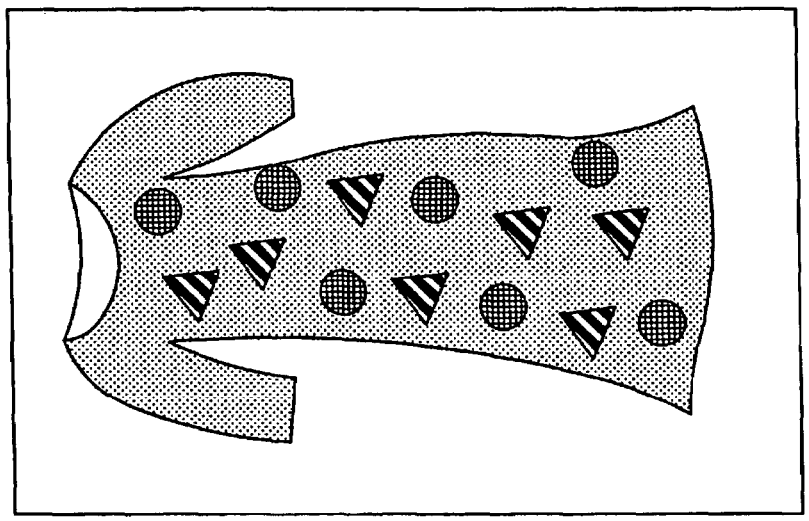
FIG. 3B2  SECOND IMAGE 30a2
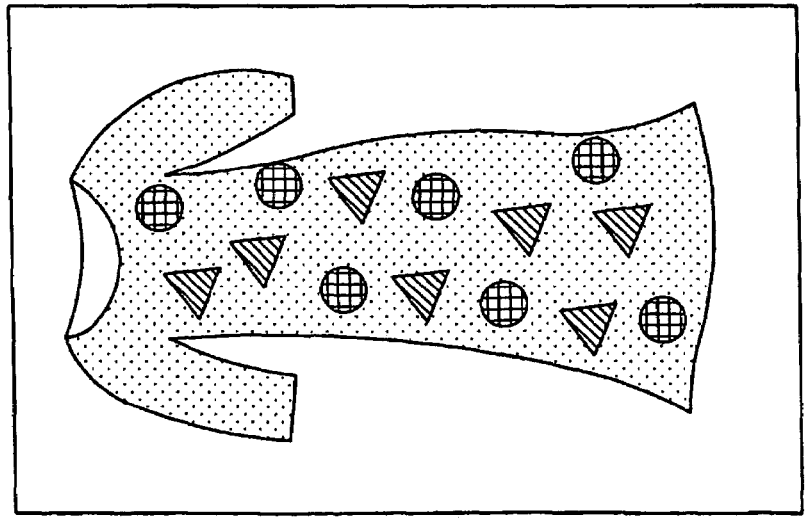
FIG. 3B1  SECOND IMAGE 30a1

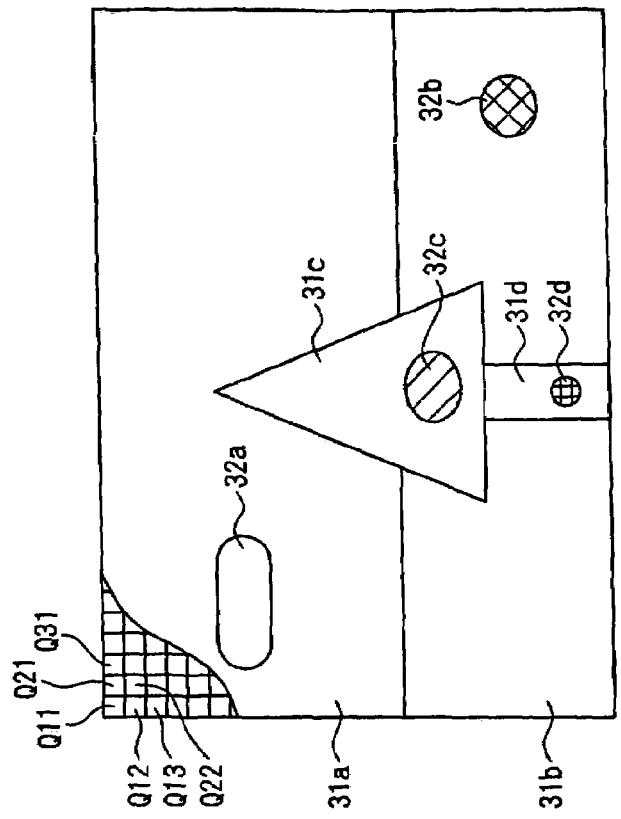
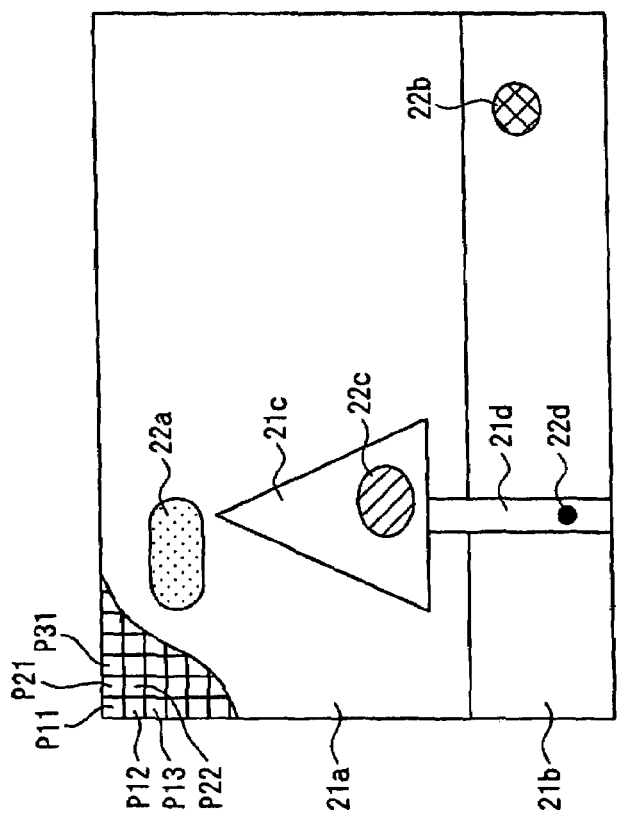

SECOND IMAGE 30a

FIRST IMAGE 20a

SECOND IMAGE 50a

FIRST IMAGE 40a

IMAGE PROCESSING METHOD OF DETECTING A CORRESPONDENCE BETWEEN COLORS, IMAGE PROCESSING APPARATUS AND PROGRAM FOR DETECTING A CORRESPONDENCE BETWEEN COLORS

"This application is a 371 of PCT/JP05/08824 filed on May 9, 2005".

TECHNICAL FIELD

The present invention relates to an image processing method, an image processing apparatus using the method, and an image processing program for causing a computer to perform the method.

BACKGROUND ART

Conventionally, in photographing the same subject under different conditions, an image of different color tone may be produced from data of the photographed result depending on the condition, whereby the technical operator performs an image processing for matching the subject color of plural images by operating the image processing software.

One of such conventional techniques involves picking up the image of the same subject employing the apparatuses that are different in the photographing environments and photographing characteristics, for example, a scanner and a digital camera, and making the correction to match the color of both images which may be different due to differences in the photographing environments and characteristics. JP7-121681A disclosed the technique relating to the correction, and JP9-147098A disclosed the technique relating to the correction of tint for one image.

Also, the conventional image processing apparatus as described in JP9-298657A performs an image processing method of correcting plural images for color tone, based on the parameters for changing the color tone which are manually inputted by the operator, to match the color tone for plural images having different color tone.

However, with the correction techniques as described in JP7-121681A and JP9-147098A, though the color correction or color matching is made between two images, it was difficult to match the color of two images.

Also, in the image processing apparatus as described in JP9-298657A, there was a problem that the general user having no specialized experience or technique for the operation was not easy to match the color tone, since the operator must have some skills to correct objectively or match the color tone by operating the parameters.

DISCLOSURE OF THE INVENTION (Form 1) In order to solve the above-mentioned problems, an image processing method of form 1 comprises a detection step of detecting a correspondence between one color of a first plurality of colors in a first image and one color of a second plurality of colors in a second image, and a correction step of correcting the first plurality of colors or the second plurality of colors in accordance with the correspondence.

Since the image processing method of form 1 comprises the detection step of detecting a correspondence between the former one color and the latter one color, and the correction step of correcting one of the first plurality of colors and the second plurality of colors in accordance with the correspondence, it is possible to easily match the plurality of colors on one side with the plurality of colors on the other side.

(Form 2) Further, the image processing method of form 2 is the image processing method according to form 1, wherein the detection step comprises detecting a plurality of correspondences between a first plurality of feature colors and a second plurality of feature colors by extracting the first plurality of feature colors featuring the first image from the first image and extracting the second plurality of feature colors featuring the second image from the second image.

With the image processing method of form 1 or 2, when the color of the first image and the color of the second image are not slid evenly on the color space, for example, it is possible to correct the color of image by specifying plural sets of correspondent color in view of a slide in the color between both images.

(Form 3) Further, the image processing method of form 3 is the image processing method according to form 2, wherein the detection step comprises making a first decision of deciding the first plurality of feature colors in accordance with the extent of appearance of the first plurality of colors, and making a second decision of deciding the second plurality of feature colors in accordance with the extent of appearance of the second plurality of colors.

(Form 4) Further, the image processing method of form 4 is the image processing method according to form 3, wherein the detection step comprises making the first decision in accordance with the extent of appearance of a third plurality of colors over a predetermined extent of appearance among the first plurality of colors, and making the second decision in accordance with the extent of appearance of a fourth plurality of colors over a predetermined extent of appearance among the second plurality of colors.

Since the image processing method of form 3 or 4 handles the colors alone having the appearance frequency greater than a certain threshold, it is possible to simplify the processing.

(Form 5) Further, the image processing method of form 5 is the image processing method according to form 3, wherein the detection step comprises detecting the plurality of correspondences so that a sum of color differences between the feature colors corresponding to each other may be minimized for possible combinations of the first plurality of feature colors and the second plurality of feature colors.

With the image processing method of form 5, it is possible to automatically associate the feature colors based on a sum of color differences between feature colors.

(Form 6) Further, the image processing method of form 6 is the image processing method according to form 5, wherein the detection step comprises weighting the color differences and the extents of appearance, and calculating a weighted sum of color differences and a weighted sum of extents of appearance.

With the image processing method of form 6, it is possible to improve the precision of correspondence by adjusting the weights of color difference and appearance frequency.

(Form 7) Further, the image processing method of form 7 is the image processing method according to form 2, wherein the detection step comprises detecting the plurality of correspondences by pattern matching of the color histogram.

With the image processing method of form 7, it is possible to reduce the error of correspondence, because the optimal correspondence is made over the histogram.

(Form 8) Further, the image processing method of form 8 is the image processing method according to form 1, wherein the correction step comprises correcting the other colors with reference to one of the first plurality of colors and the second plurality of colors.

(Form 9) Further, the image processing method of form 9 is the image processing method according to form 1, wherein the correction step comprises correcting at least one of hue, saturation and lightness based on a color specification system of hue, saturation and lightness.

With the image processing method of form 8 or 9, when an image of the clothes is picked up by the digital camera, for example, it is possible to perform the correction processing in an appropriate color specification system depending on the processing object, without correcting the lightness strongly related with the shading, and by correcting only the hue and saturation strongly related with the tint, because the shading of clothes in the image is important as the information indicating solidness.

(Form 10) Further, the image processing method of form 10 is the image processing method according to form 2, wherein the correction step comprises extracting the feature colors based on a predetermined domain, or a domain specified by the user.

With the image processing method of form 10, since the correction processing is made for the specified domain, it is possible to eliminate the influence of the image domain such as the background irrelevant with the subject on the image domain of the subject by specifying the image domain of the subject to be corrected, and optimally correct the image domain of the subject to be corrected.

(Form 11) In order to solve the above-mentioned problems, an image processing apparatus of form 11 comprises a detection part of detecting a correspondence between one color of a first plurality of colors in a first image and one color of a second plurality of colors in a second image, and a correction part of correcting the first plurality of colors or the second plurality of colors in accordance with the correspondence.

(Form 12) Further, the image processing apparatus of form 12 is the image processing apparatus according to form 11, further comprising a first input part for inputting the first image, and a second input part for inputting the second image.

(Form 13) Further, the image processing apparatus of form 13 is the image processing apparatus according to form 12, wherein the first input part is one of a scanner and a digital camera, and the second input part is the other of the scanner and the digital camera.

(Form 14) Further, the image processing apparatus of form 14 is the image processing apparatus according to form 11, wherein the correction part corrects the other colors with reference to one of the first plurality of colors and the second plurality of colors.

(Form 15) The image processing apparatus of form 15 is the image processing apparatus according to form 11, wherein the correction part corrects at least one of hue, saturation and lightness based on a color specification system of the hue, the saturation and the lightness.

(Form 16) The image processing apparatus of form 16 is the image processing apparatus according to form 11, wherein the detection part extracts the feature colors based on a predetermined range or a range specified by the user.

(Form 17) The image processing apparatus of form 17 is the image processing apparatus according to form 11, wherein the detection part detects a plurality of correspondences between a first plurality of feature colors and a second plurality of feature colors by extracting the first plurality of feature colors featuring the first image from the first image and extracting the second plurality of feature colors featuring the second image from the second image.

(Form 18) The image processing apparatus of form 18 is the image processing apparatus according to form 17, wherein the detection part makes a first decision of deciding the first plurality of feature colors in accordance with the extent of appearance of the first plurality of colors, and makes a second decision of deciding the second plurality of feature colors in accordance with the extent of appearance of the second plurality of colors.

(Form 19) The image processing apparatus of form 19 is the image processing apparatus according to form 18, wherein the detection part makes the first decision in accordance with the extent of appearance of a third plurality of colors over a predetermined extent of appearance among the first plurality of colors, and makes the second decision in accordance with the extent of appearance of a fourth plurality of colors over a predetermined extent of appearance among the second plurality of colors.

(Form 20) The image processing apparatus of form 20 is the image processing apparatus according to form 18, wherein the detection part detects the plurality of correspondences so that a sum of color differences between the feature colors corresponding to each other may be minimized for possible combinations of the first plurality of feature colors and the second plurality of feature colors.

(Form 21) The image processing apparatus of form 21 is the image processing apparatus according to form 20, wherein the detection part weights the color differences and the extents of appearance, and calculates a weighted sum of color differences and a weighted sum of extents of appearance.

(Form 22) The image processing apparatus of form 22 is the image processing apparatus according to form 17, wherein the detection part detects the plurality of correspondences by pattern matching of the color histogram.

(Form 23) In order to solve the above-mentioned problems, an image processing program of form 23 is the image processing program for enabling a computer to perform an image processing, the computer having a detection part and a correction part which cooperate to perform the image processing, wherein the program comprises a detection step of causing the detection part to detect a correspondence between one color of a first plurality of colors in a first image and one color of a second plurality of colors in a second image, and a correction step of causing the correction part to correct the first plurality of colors or the second plurality of colors in accordance with the correspondence.

(Form 24) Further, the image processing program of form 24 is the image processing program according to form 23, wherein the detection step comprises detecting a plurality of correspondences between a first plurality of feature colors and a second plurality of feature colors by extracting the first plurality of feature colors featuring the first image from the first image and extracting the second plurality of feature colors featuring the second image from the second image.

(Form 25) Further, the image processing program of form 25 is the image processing program according to form 24, wherein the detection step comprises making a first decision of deciding the first plurality of feature colors in accordance with the extent of appearance of the first plurality of colors, and making a second decision of deciding the second plurality of feature colors in accordance with the extent of appearance of the second plurality of colors.

(Form 26) Further, the image processing program of form 26 is the image processing program according to form 25, wherein the detection step comprises making the first decision in accordance with the extent of appearance of a third plurality of colors over a predetermined extent of appearance among the first plurality of colors, and making the second decision in accordance with the extent of appearance of a fourth plurality of colors over a predetermined extent of appearance among the second plurality of colors.

(Form 27) Further, the image processing program of form 27 is the image processing program according to form 25, wherein the detection step comprises detecting the plurality of correspondences so that a sum of color differences between the feature colors corresponding to each other may be minimized for possible combinations of the first plurality of feature colors and the second plurality of feature colors.

(Form 28) Further, the image processing program of form 28 is the image processing program according to form 27, wherein the detection step comprises weighting the color differences and the extents of appearance, and calculating a weighted sum of color differences and a weighted sum of extents of appearance.

(Form 29) Further, the image processing program of form 29 is the image processing program according to form 24, wherein the detection step comprises detecting the plurality of correspondences by pattern matching of the color histogram.

(Form 30) Further, the image processing program of form 30 is the image processing program according to form 23, wherein the correction step comprises correcting the other colors with reference to one of the first plurality of colors and the second plurality of colors.

(Form 31) Further, the image processing program of form 31 is the image processing program according to form 23, wherein the correction step comprises correcting at least one of hue, saturation and lightness based on a color specification system of hue, saturation and lightness.

(Form 32) Further, the image processing program of form 32 is the image processing program according to form 24, wherein the detection step comprises extracting the feature colors based on a predetermined domain, or a domain specified by the user.

(Form 33) In order to solve the above-mentioned problems, a computer readable storage medium of form 33 storing an image processing program is the computer readable storage medium storing the image processing program according to any one of forms 23 to 32.

Thereby, the same action and effect are attained as the image processing program according to any one of forms 23 to 32, and the image processing program is easily delivered or received via a recording medium such as CD-ROM or DVD-ROM MO.

(Form 34) Also, in order to solve the above-mentioned problems, an image processing method of form 34 comprises a specification step of specifying the color in each of two images, and a correction step of correcting the other color in one image in accordance with the relationship between both the colors.

With the image processing method of form 34, since the correction step comprises correcting the other color in accordance with the relationship between both the colors specified at the specification step, it is possible to correct the one image without requiring the technical input operation of parameters, unlike the conventional image processing method.

(Form 35) Also, in order to solve the above-mentioned problems, an image processing method of form 35 comprises a first specification step of specifying one first domain in a first image capable of specifying a plurality of first domains each having the domain representative color information indicating the representative color of domain, a second specification step of specifying one second domain in a second image capable of specifying a plurality of second domains each having the domain representative color information, the second image corresponding to the first image, a correspondence step of associating the specified one first domain and the specified one second domain, and a correction step of correcting the image color information indicating the color of the second image in accordance with the relationship between the domain representative color information of the one first domain and the domain representative color information of the one second domain which are associated.

With the image processing method of form 35, at the correction step, the second image is corrected in accordance with the relationship between the domain representative color information of the one second domain and the domain representative color information of the one first domain that are specified at the first and second specification steps, it is possible to correct the second image without requiring the technical input operation of parameters, unlike the conventional image processing method.

(Form 36) Further, the image processing method of form 36 is the image processing method according to form 35, wherein the second specification step comprises specifying two or more second domains, and the correction step comprises correcting the image color information in accordance with the relationship between the position of each of the second plurality of domains and the position of each of the two or more second domains.

With the image processing method according to any one of forms 34 to 36, since one correspondent color is specified by a plurality of domains, the information quantity for reference is increased, whereby the correspondent color with high precision can be obtained.

(Form 37) Further, the image processing method of form 37 is the image processing method according to form 35, wherein the first specification step comprises specifying two or more first domains, the second specification step comprises specifying two or more second domains, and the correction step comprises correcting the image color information by different correction methods each depending on the number of correspondences between the two or more first domains and the two or more second domains.

With the image processing method of form 37, when the color of the first image and the color of the second image are not slid evenly on the color space, for example, it is possible to correct the color of image by specifying plural sets of correspondent color in view of a slide in the color between both images.

(Form 38) Further, the image processing method of form 38 is the image processing method according to form 35, further comprising a definition step of defining the domain representative color information of the domain in terms of the small domain representative color information indicating the representative colors of small domains contained in the domain.

(Form 39) Further, the image processing method of form 39 is the image processing method according to form 38, wherein the definition step comprises defining the domain representative color information of the domain in terms of a plurality of small domain representative color information indicating the representative colors of a plurality of small domains contained in the domain.

With the image processing method of form 38 or 39, since the domain representative color information is defined by the small domain representative color information indicating the representative color of small domain, it is possible to define the domain representative color information more properly.

(Form 40) Further, the image processing method of form 40 is the image processing method according to form 38, wherein the definition step comprises defining the domain representative color information of the domain in terms of the small domain representative color information indicating the color having the highest percentage of area occupied in the domain among the plurality of small domain representative color information.

With the image processing method of form 40, since the correspondent color is the color having the greatest appearance frequency (area) within the specified domain, it is possible to avoid that the correspondent color becomes the color regarded as noise.

(Form 41) Further, the image processing method of form 41 is the image processing method according to form 38, wherein the definition step comprises defining the domain representative color information of the domain in terms of the small domain representative color information indicating the color in which the percentage of area occupied in the domain is greater than or equal to a predetermined rate among the plural pieces of small domain representative color information.

With the image processing method of form 41, when a photographed image of the cloth or clothes is processed, with a fine design in the domain of correspondent color, and there are a plurality of colors of which the appearance frequency (area) is over a predetermined rate and the color difference is over a predetermined rate, the representative value of each color is the correspondent color, and the correspondent color of each color making up the design is processed, whereby it is possible to correct the image at higher precision.

(Form 42) Further, the image processing method of form 42 is the image processing method according to form 35, wherein at least one of the first specification step and the second specification step comprises specifying a neighboring domain near the one domain specified by the one specification step, and the definition step comprises defining the domain representative color information of the one domain in terms of the neighboring domain representative color information indicating the representative color of both the one domain and the neighboring domain.

With the image processing method of form 42, when the correspondent color is specified by one point on the image, for example, in some instances the point may not have the intended color due to mingled noise or dust in inputting the image, whereby the correspondent color is made the representative color of the domain by specifying the domain, making it possible to reduce the influence of the noise.

(Form 43) Further, the image processing method of form 43 is the image processing method according to form 35, wherein at least one of the first specification step and the second specification step comprises specifying an equivalent domain represented by the color substantially equivalent to the representative color of the one domain specified by the one specification step, and the definition step comprises defining the domain representative color information of the one domain in terms of the equivalent domain representative color information indicating the representative color of both the one domain and the equivalent domain.

With the image processing method of form 43, when a specific point is designated, the correspondent color is made the color of the domain based on a predetermined range of color difference consecutive from the designated point, whereby it is possible to automatically select the appropriate range and reduce the influence of noise.

(Form 44) Further, the image processing method of form 44 is the image processing method according to form 35, wherein at least one of the first specification step and the second specification step comprises specifying the one domain by any drawing.

(Form 45) In order to solve the above-mentioned problems, an image processing apparatus of form 45 is the image processing apparatus for performing an image processing for a first image capable of specifying a plurality of first domains each having the domain representative color information indicating the representative color of the domain and a second image capable of specifying a plurality of second domains each having the domain representative color information, comprising a first specification part for specifying one first domain, a second specification part for specifying one second domain, and a correction part for correcting the image color information indicating the color of each of the plurality of second images in accordance with the relationship between the domain representative color information of the one first domain and the domain representative color information of the one second domain.

(Form 46) Further, the image processing apparatus of form 46 is the image processing apparatus according to form 45, wherein the second specification part specifies two or more second domains, and the correction part corrects the image color information in accordance with the relationship between the position of each of the second plurality of domains and the position of each of the two or more second domains.

(Form 47) Further, the image processing apparatus of form 47 is the image processing apparatus according to form 45, wherein the first specification part specifies two or more first domains, the second specification part specifies two or more second domains, and the correction part corrects the image color information by different correction methods each depending on the number of correspondences between the two or more first domains and the two or more second domains.

(Form 48) Further, the image processing apparatus of form 48 is the image processing apparatus according to form 45, further comprising a definition part for defining the domain representative color information of the domain in terms of the small domain representative color information indicating the representative colors of small domains contained in the domain.

(Form 49) Further, the image processing apparatus of form 49 is the image processing apparatus according to form 48, wherein the definition part defines the domain representative color information of the domain in terms of a plurality of small domain representative color information indicating the representative colors of a plurality of small domains contained in the domain.

(Form 50) Further, the image processing apparatus of form 50 is the image processing apparatus according to form 48, wherein the definition part defines the domain representative color information of the domain in terms of the small domain representative color information indicating the color having the highest percentage of area occupied in the domain among the plurality of small domain representative color information.

(Form 51) Further, the image processing apparatus of form 51 is the image processing apparatus according to form 48, wherein the definition part defines the domain representative color information of the domain in terms of the small domain representative color information indicating the color in which the percentage of area occupied in the domain is greater than or equal to a predetermined rate among the plural pieces of small domain representative color information.

(Form 52) Further, the image processing apparatus of form 52 is the image processing apparatus according to form 45, wherein at least one of the first specification part and the second specification part specifies a neighboring domain near the one domain specified by the one specification part, and the definition part defines the domain representative color information of the one domain in terms of the neighboring domain representative color information indicating the representative color of both the one domain and the neighboring domain.

(Form 53) Further, the image processing apparatus of form 53 is the image processing apparatus according to form 45, wherein at least one of the first specification part and the second specification part specifies an equivalent domain represented by the color substantially equivalent to the representative color of the one domain specified by the one specification part, and the definition part defines the domain representative color information of the one domain in terms of the equivalent domain representative color information indicating the representative color of both the one domain and the equivalent domain.

(Form 54) Further, the image processing apparatus of form 54 is the image processing apparatus according to form 45, wherein at least one of the first specification part and the second specification part specifies the one domain by any drawing.

(Form 55) In order to solve the above-mentioned problems, an image processing program of form 55 comprises, in a second image corresponding to a first image capable of specifying a plurality of first domains each having the domain representative color information indicating the representative color of the domain, the second image capable of specifying a plurality of second domains each having the domain representative color information, a specification step of specifying one second domain, and a correction step of correcting the image color information indicating the color of the second image in accordance with the relationship between the domain representative color information of the one second domain and the domain representative color information of one first domain corresponding to the one second domain.

(Form 56) Also, in order to solve the above-mentioned problems, an image processing program of form 56 is the image processing program for enabling a computer to perform an image processing, the computer having a first input part, a second input part of which the color characteristic is different from that of the first input part, a decision part, a first specification part, a second specification part and a correction part which cooperate to perform the image processing between a first image capable of specifying a plurality of first domains each having the domain representative color information indicating the representative color of the domain and a second image capable of specifying a plurality of second domains each having the domain representative color information, the program comprising a first specification step of causing the first specification part to specify one first domain, a second specification step of causing the second specification part to specify one second domain, and a correction step of causing the correction part to correct the image color information indicating the color of the second image in accordance with the relationship between the domain representative color information of the one first domain and the domain representative color information of the one second domain.

(Form 57) Further, the image processing program of form 57 is the image processing program according to form 56, wherein the second specification step comprises specifying two or more second domains, and the correction step comprises correcting the image color information in accordance with the relationship between the position of each of the plurality of second domains and the position of each of the two or more second domains.

(Form 58) Further, the image processing program of form 58 is the image processing program according to form 56, wherein the first specification step comprises specifying two or more first domains, the second specification step comprises specifying two or more second domains, and the correction step comprises correcting the image color information by different correction methods each depending on the number of correspondences between the two or more first domains and the two or more second domains.

(Form 59) Further, the image processing program of form 59 is the image processing program according to form 56, further comprising a definition step of defining the domain representative color information of the domain in terms of the small domain representative color information indicating the representative colors of small domains contained in the domain.

(Form 60) Further, the image processing program of form 60 is the image processing program according to form 59, wherein the definition step comprises defining the domain representative color information of the domain in terms of a plurality of small domain representative color information indicating the representative colors of a plurality of small domains contained in the domain.

(Form 61) Further, the image processing program of form 61 is the image processing program according to form 59, wherein the definition step comprises defining the domain representative color information of the domain in terms of the small domain representative color information indicating the color having the highest percentage of area occupied in the domain among the plurality of small domain representative color information.

(Form 62) Further, the image processing program of form 62 is the image processing program according to form 59, wherein the definition step comprises defining the domain representative color information of the domain in terms of the small domain representative color information indicating the color in which the percentage of area occupied in the domain is greater than or equal to a predetermined rate among the plural pieces of small domain representative color information.

(Form 63) Further, the image processing program of form 63 is the image processing program according to form 56, wherein at least one of the first specification step and the second specification step comprises specifying a neighboring domain near the one domain specified by the one specification step, and the definition step comprises defining the domain representative color information of the one domain in terms of the neighboring domain representative color information indicating the representative color of both the one domain and the neighboring domain.

(Form 64) Further, the image processing program of form 64 is the image processing program according to form 56, wherein at least one of the first specification step and the second specification step comprises specifying an equivalent domain represented by the color substantially equivalent to the representative color of the one domain specified by the one specification step, and the definition step comprises defining the domain representative color information of the one domain in terms of the equivalent domain representative color information indicating the representative color of both the one domain and the equivalent domain.

(Form 65) Further, the image processing program of form 65 is the image processing program according to form 56, wherein at least one of the first specification step and the second specification step comprises specifying the one domain by any drawing.

(Form 66) In order to solve the above-mentioned problems, a computer readable storage medium of form 66 storing an image processing program is the computer readable storage medium storing the image processing program for enabling a computer to perform an image processing, the computer having a first input part, a second input part of which the color characteristic is different from that of the first input part, a decision part, a first specification part, a second specification part and a correction part which cooperate to perform the image processing between a first image capable of specifying a plurality of first domains each having the domain representative color information indicating the representative color of the domain and a second image capable of specifying a plurality of second domains each having the domain representative color information, the program comprising a first specification step of causing the first specification part to specify one first domain, a second specification step of causing the second specification part to specify one second domain, and a correction step of causing the correction part to correct the image color information indicating the color of the second image in accordance with the relationship between the domain representative color information of the one first domain and the domain representative color information of the one second domain.

BRIEF DESCRIPTION OF THE DRAWINGS

FIGS. 3B1, 3B2 and 3B3 are views showing three images after processing by the image processing apparatus of the embodiment 1;

FIGS. 9A and 9B are views showing two images before processing by an image processing apparatus of an embodiment 2;

BEST MODE FOR CARRYING OUT THE INVENTION

The preferred embodiment 1 of an image processing apparatus according to the present invention will be described below with reference to the drawings.

<Configuration>

Figure 1:
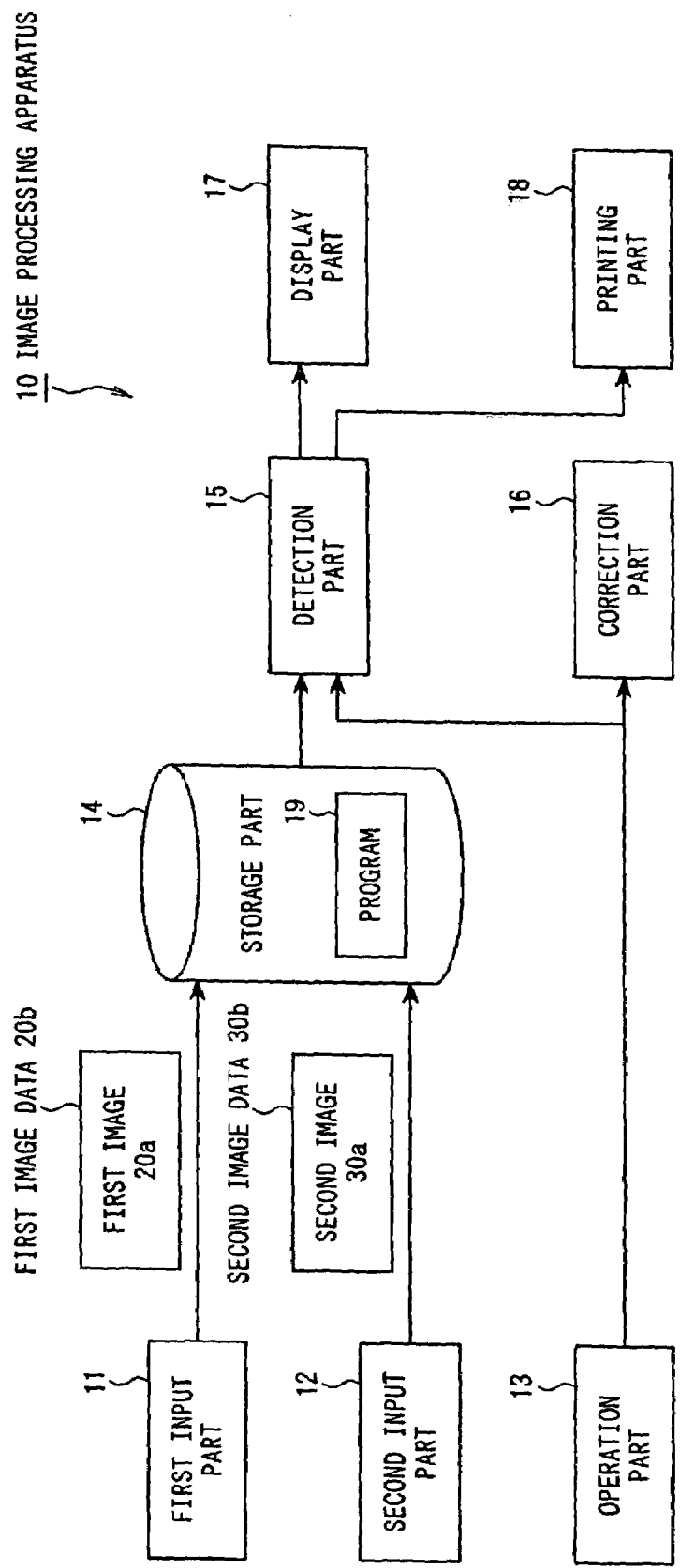
FIG. 1 is a diagram showing the configuration of an image processing apparatus according to the embodiments 1 to 3 of the present invention.
Figure 2B:
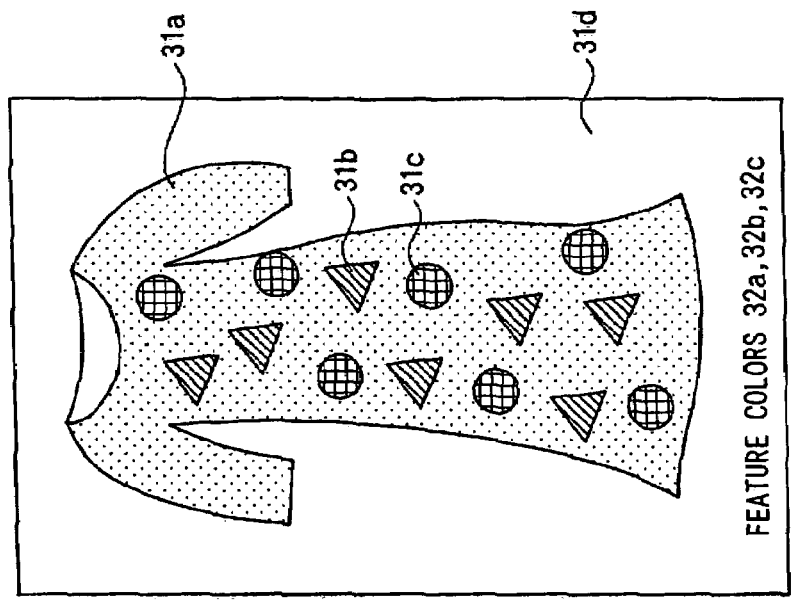
FIGS. 2A and 2B are views showing two images before processing by the image processing apparatus of an embodiment 1.
Figure 2A:
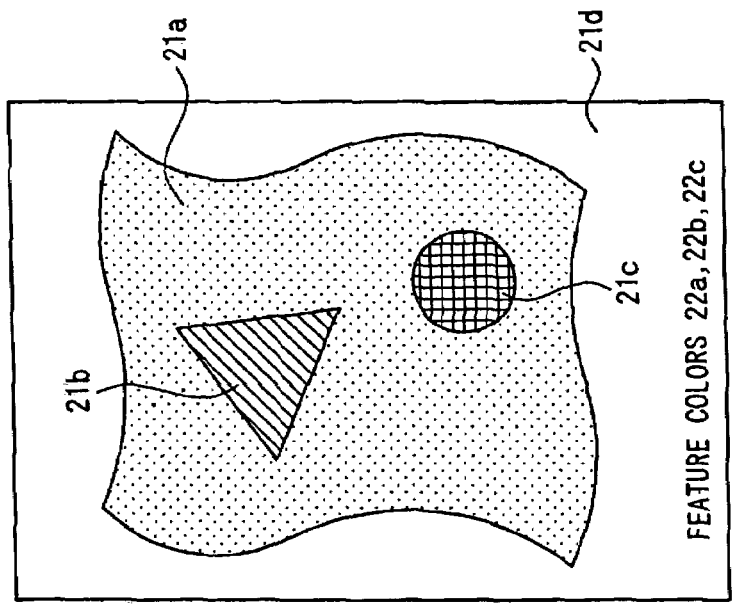

FIG. 1 is a diagram showing the configuration of an image processing apparatus according to an embodiment of the invention, FIGS. 2A and 2B show two images before processing by the image processing apparatus of this embodiment, and FIGS. 3B1, 3B2 and 3B3 show three images after processing by the image processing apparatus of this embodiment. The image processing apparatus 10 of this embodiment comprises a first input part 11, a second input part 12, an operation part 13, a storage part 14, a detection part 15, a correction part 16, a display part 17 and a printing part 18 to correct a second image 30a by referring to a first image 20a.

The first input part 11 may be a scanner, for example, for scanning the print contents printed on a print medium such as a print sheet and reading them in digital format to produce the first image data 20b representing the read first image 20a.

The second input part 12 may be a digital camera, for example, for picking up an image of the subject such as substance to produce the second image data 30b representing the taken second image 30a.

Herein, the input by the first input part 11 that is the scanner has a relatively high reliability in the color of the input first image 20a, because the conditions for its light source and background are fixed, where as the input by the second input part 12 that is the digital camera has a relatively low reliability in the color of the input second image 30a, because the conditions for its light source and background are not fixed.

Though in this embodiment, the first input part 11 and the second input part 12 are integrated, together with the other parts 13 to 18, into the image processing apparatus 10, the first input part 11, the second input part 12 and the other parts (13 to 18) may be constituted separately.

As shown in FIGS. 2A and 2B, the first image 20a representing a sample of cloth is composed of the objects 21a, 21b, 21c and 21d which are basic texture, triangular pattern, round pattern and background, and the second image 30a representing a dress fabricated using the cloth is also composed of the objects 31a, 31b, 31c and 31d which are basic texture, triangular pattern, round pattern and background corresponding to the objects 21a, 21b, 21c and 21d of the first image 20a.

Returning to FIG. 1, the operation part 13 may be a mouse or a keyboard, for example, which is employed to perform an operation required to correct the first and second images 20a and 30a, for example, to specify a range for extracting the feature color.

The storage part 14 may be a storage medium such as a hard disk or a flexible disk, for example, which is employed to store the first image data 20b produced by the first input part 11 and the second image data 30b produced by the second input part 12. The storage part 14 also stores a program 19 for causing the image processing apparatus 10 to perform the image processing for the first and second images 20a and 30a.

The detection part 15 may be a CPU (Central Processing Unit), for example, which extracts a first plurality of feature colors 22a, 22b and 22c (as will be described later with reference to FIGS. 5A and 5B) from the first image 20a and extracts a second plurality of feature colors 32a, 32b and 32c (as will be described later with reference to FIGS. 5A and 5B) from the second image 30a to associate both the feature colors.

The correction part 16, may be a CPU, like the detection part 15, which corrects the colors of the second image 30a having relatively low reliability to conform with the colors of the first image 20a having relatively high reliability in accordance with the correspondences between the first plurality of feature colors 22a, 22b, 22c and the second plurality of feature colors 32a, 32b, 32c, which are made by the detection part 15.

The display part 17 may be a liquid crystal display or a CRT (Cathode Ray Tube) display, which displays the first image 20a and the second image 30a before correction, and the second images 30a1, 30a2 and 30a3 after correction, as shown in FIGS. 2A and 2B, and 3B1 to 3B3.

The printing part 18 may be an ink jet printer, for example, which prints the first image 20a and the second image 30a before correction, and the second images 30a1, 30a2 and 30a3 after correction, like the display part 17, as shown in FIGS. 2A and 2B, and 3B1 to 3B3.

<Operation>

Figure 4:
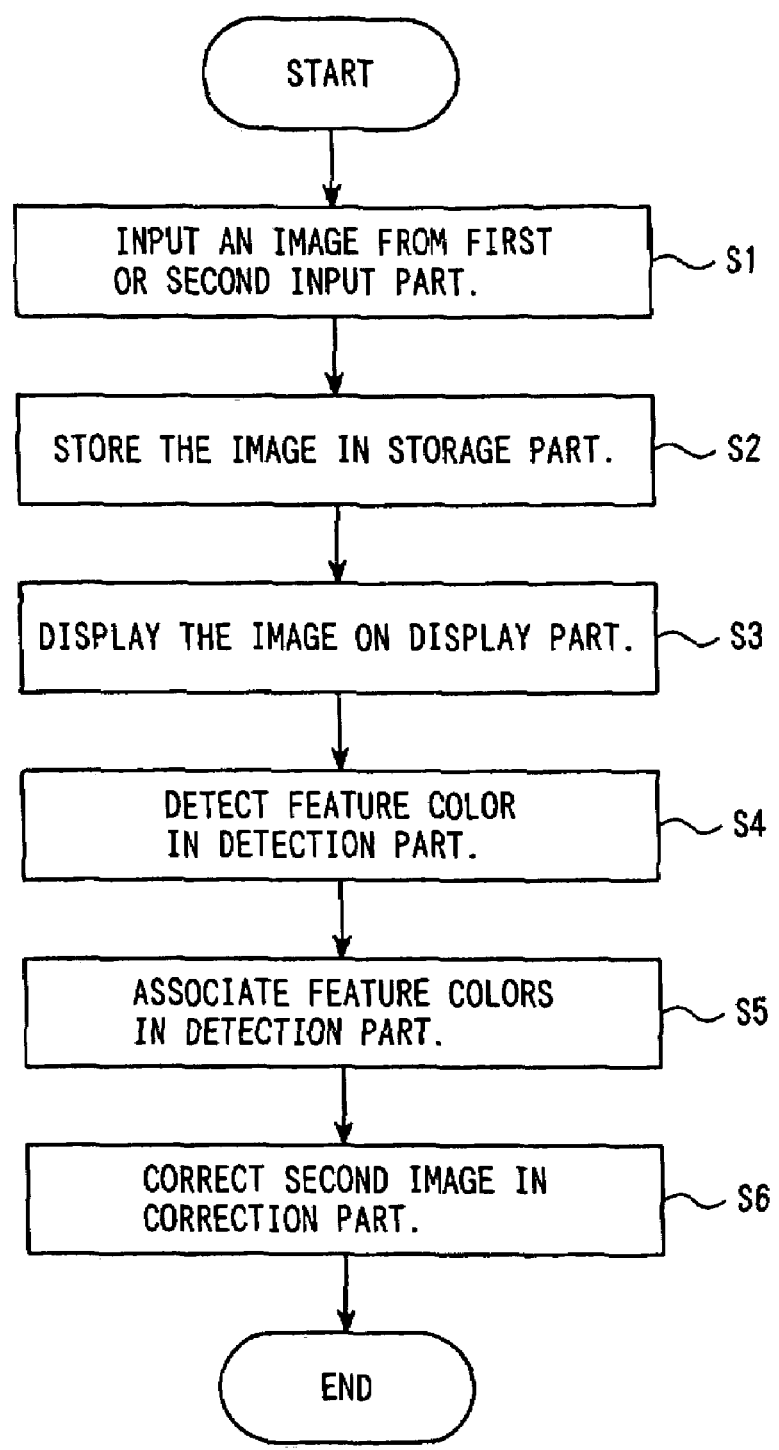
FIG. 4 is a flowchart showing the operation of the image processing apparatus of the embodiment 1.

FIG. 4 is a flowchart showing the operation of the image processing apparatus of this embodiment. The operation of the image processing apparatus of this embodiment will be described below along with the flowchart of FIG. 4. Herein, the program 19 in this embodiment comprises a detection step corresponding to steps S4 and S5 of FIG. 4 and a correction step corresponding to step S6 of FIG. 4.

Step S1: The first input part 11 reads the image 20a as shown in FIG. 2A by scanning it to produce the first image data 20b representing the contents of the image 20a. Subsequently, the second input part 12 picks up an image of the subject to produce the second image data 30b representing the second image 30a acquired as a result, as shown in FIG. 2B.

Step S2: The first and second input parts 11 and 12 output the first and second image data 20b and 30b to the storage part 14, which stores the first and second image data 20b and 30b.

Step S3: The detection part 15 reads the first and second image data 20b and 30b stored in the storage part 14 from the storage part 14, and displays them on the display part 17.

Step S4: The detection part 15 extracts the feature colors 22a, 22b and 22c from the first image 20a and extracts the feature colors 32a, 32b and 32c from the second image 30a.

Figure 5A:
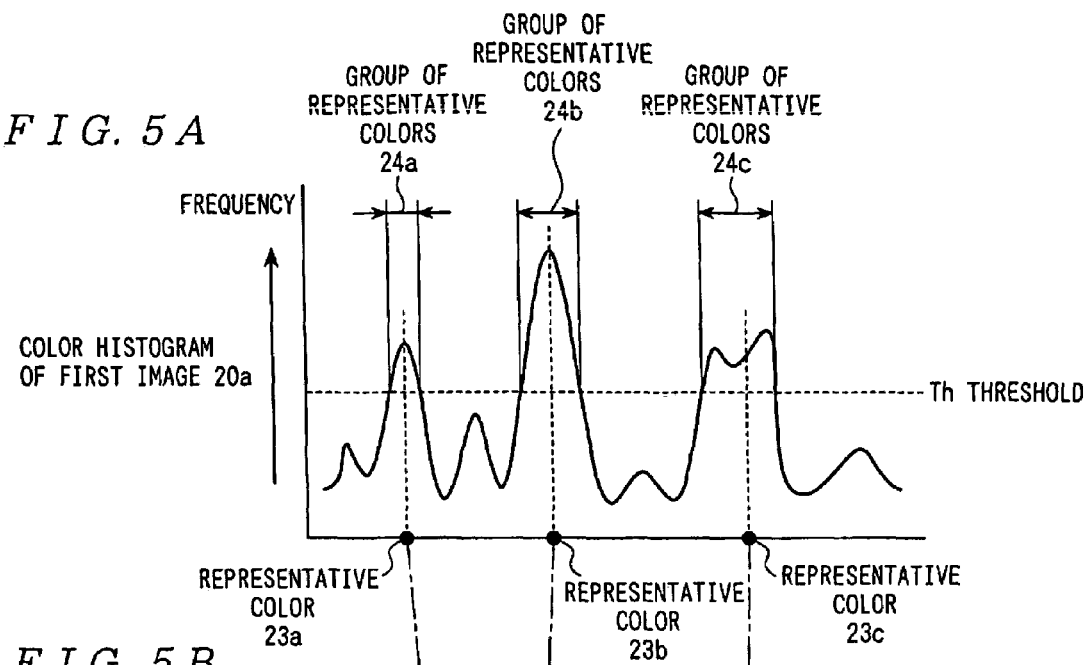
FIGS. 5A and 5B are graphs for explaining the extraction of feature color in the embodiment 1.
Figure 5B:
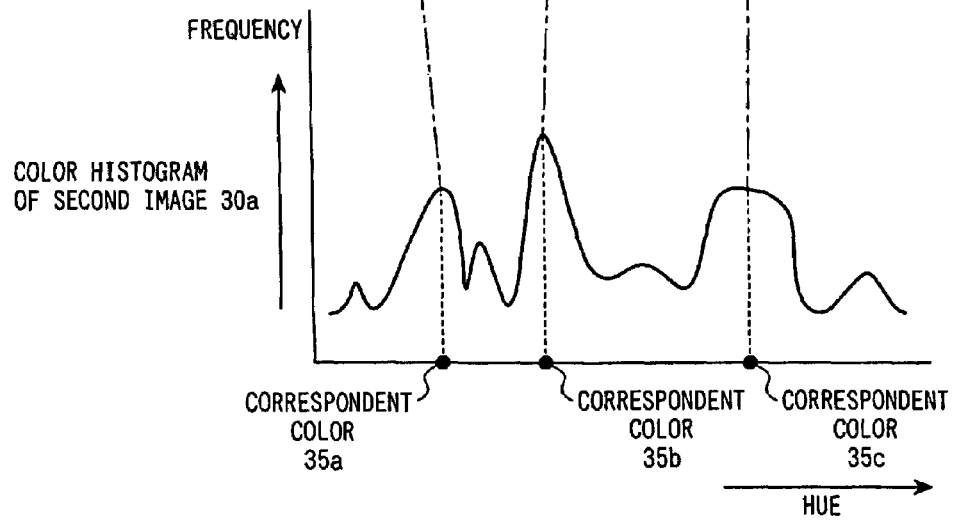

FIGS. 5A and 5B are diagrams for explaining the extraction of feature colors. In a color histogram as shown in FIGS. 5A and 5B, the transversal axis represents the hue and the longitudinal axis represents the frequency of appearance. FIG. 5A shows the frequency of appearance along the longitudinal axis, which is equivalent to a total number of elements or a sum of areas making up the first image 20a as shown in FIG. 2A, for each hue as represented along the transversal axis. Similarly, FIG. 5B shows the frequency of appearance along the longitudinal axis, which is equivalent to a total number of elements or a sum of areas making up the second image 30a as shown in FIG. 2B, for each hue as represented along the transversal axis. Herein, the number of elements or the area means the number of pixels in the bit map data, or the area of closed domain in the vector data, for example.

The detection part 15 selects the representative colors 23a, 23b and 23c at the highest appearance frequency (peak) of hue, or more correctly, the maximal value of hue, as the feature colors 22a, 22b and 22c of the first image 20a, from the color histogram of FIG. 5A. Instead of the above selection, the detection part 15 may select directly the representative color groups 24a, 24b and 24c with higher appearance frequency of hue than a threshold Th, or its average, median and mode, to avoid adverse influence due to hue with low appearance frequency and improve the precision of correction.

The detection part 15 selects the feature colors 32a, 32b and 32c for the second image 30a in the same way as selecting the representative colors 23a, 23b and 23c or the representative color groups 24a, 24b and 24c for the first image 20a. In the latter selection, the detection part 15 may employ any other threshold than the threshold Th.

The transversal axis in FIGS. 5A and 5B may employ a color specification system (one- or two-dimensional or more) such as RGB, CMY, hue-saturation-lightness, or L*a*b of the CIE (International Lighting Commission), whereby it is possible to make adequate correction between two images in which the illuminating environment (lightness) is greatly different at the photographing time without giving consideration to lightness.

Instead of the above extraction using the color histogram, the detection part 15 may extract the feature colors representing the range or domain which is specified by the user on the operation part 13, for example.

Step S5: The detection part 15 associates the feature colors 22a, 22b and 22c of the first image 20a and the feature colors 32a, 32b and 32c of the second image 30a. The detection part 15 associates the feature colors 22a, 22b and 22c and the feature colors 32a, 32b and 32c so that the total of differences between one feature color $22x$ (x is a, b or c) of the feature colors 22a, 22b and 22c and one feature color $32y$ (y is a, b or c) of the feature colors 32a, 32b and 32c, or in other words, the total of color differences between the feature colors $22x$ and $32y$ corresponding to each other for possible combinations of the first feature colors 22a, 22b and 22c and the second feature colors 32a, 32b and 32c may be minimized, for example.

In calculating the total of color differences (total difference), it is possible for the detection part 15 to weight each color differences between the feature colors $22x$ and $32y$, and also the appearance frequency of each feature colors $22x$ and $32y$, and calculate the weighted sum of the weighted color differences and the weighted appearance frequencies.

As a result of the correspondence, the representative color 23a that is the feature color 22a of the first image 20a and the correspondent color 35a that is the feature color 32a of the second image 30a are associated, the representative color 23b that is the feature color 22b of the first image 20a and the correspondent color 35b that is the feature color 32b of the second image 30a are associated, and the representative color 23c that is the feature color 22c of the first image 20a and the correspondent color 35c that is the feature color 32c of the second image 30a are associated, as shown in FIGS. 5A and 5B.

The detection part 15, instead of the correspondence based on the total of color differences, may make correspondence employing the conventionally well-known pattern matching methods (e.g., DP matching, graph matching or DLA (Dynamic Link Architecture) of associating the graphs (nodes) by optimizing the evaluation function by dynamic statistical method). Since the optimal correspondence can be made over the entire histogram as shown in FIGS. 5A and 5B by employing the pattern matching methods, the correspondences between the feature colors 22a, 22b and 22c and the feature colors 32a, 32b and 32c are made at high precision.

Step S6: The correction part 16 corrects the color tone of the second image 30a based on the first image 20a by referring to the above correspondences.

Figure 6:
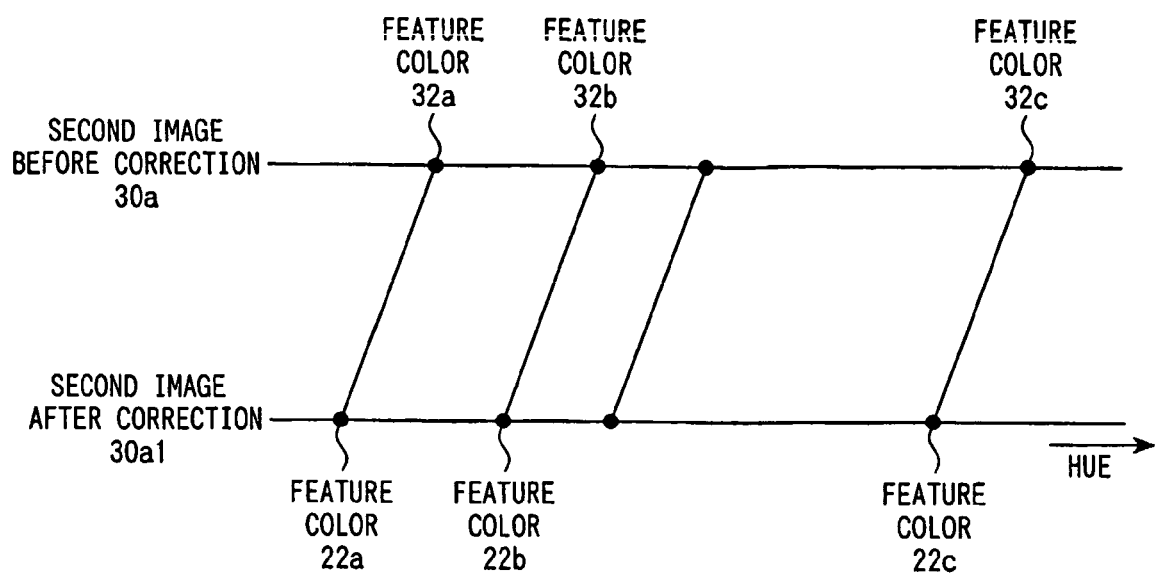
FIG. 6 is a diagram showing the correction by a correction part in the embodiment 1.

FIG. 6 shows the correction by the correction part in this embodiment. The correction part 16 translates the feature colors 32a, 32b and 32c of the second image 30a as shown in FIG. 2B into the feature colors 22a, 22b and 22c of the first image 20a as shown in FIG. 2A, and corrects other colors than the feature colors 32a, 32b and 32c of the second image 30a, based on the correspondences between the feature colors 22a, 22b and 22c and the feature colors 32a, 32b and 32c, thereby producing the second image 30a1 after correction as shown in FIG. 3B1, as shown in FIG. 6.

Herein, if correction is made without being based on the correspondence detected by the detection part 15, unlike the above correction, correction is extremely dependent upon the hue of triangular pattern 21b and 31b, or the hue of round pattern 21c and 31c, as shown in FIGS. 3B2 and 3B3, producing the second image 30a2 and 30a3 quite different from the second image 30a1 as shown in FIG. 3B1.

<Effects>

With the image processing apparatus 10 of this embodiment as described above, the detection part 15 extracts the feature colors 22a, 22b and 22c from the first image 20a, extracts the feature colors 32a, 32b and 32c from the second image 30a, and further associates the feature colors 22a, 22b and 22c and the feature colors 32a, 32b and 32c, and the correction part 16 corrects the second image 30a based on the first image 20a by referring to the correspondences, whereby it is possible to easily match the color tone of the second image 30a with the color tone of the first image 20a.

Embodiment 2

Figure 7:
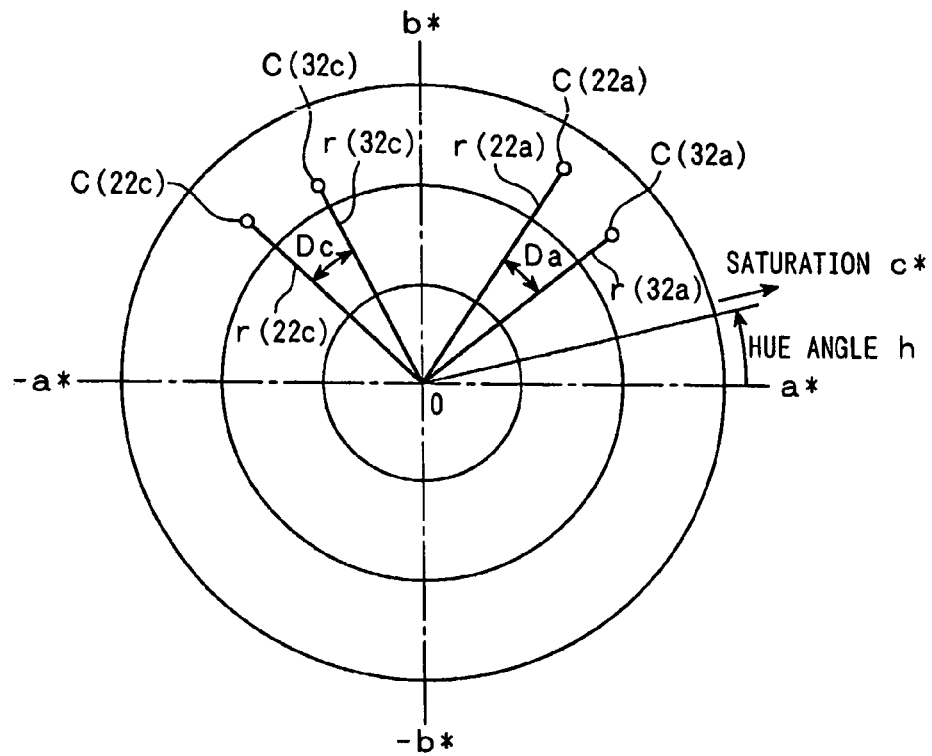
FIG. 7 is a diagram showing another correction by the correction part in a modification of the embodiment 1.

FIG. 7 shows another correction by the correction part. The correction part 16 may make the correction as shown in FIG. 7, instead of the correction as shown in FIG. 6, to achieve the same effects as above. Specifically, supposing that the feature colors 22a and 32a are only associated, the correction part 16 corrects the hue C(32a) of the feature color 32a into the hue C(22a) of the feature color 22a and further corrects, based on the correction, the hue C(32c) of the feature color 32c into the hue C(22c) of the feature color 22c in the color specification system L*a*b*, as shown in FIG. 7.

More particularly, the correction part 16 corrects the hue C(32c) into the hue C(22c) so that the angle Dc between hue C(32c) and hue C(22c) may be equal to the angle Da between hue C(32a) and hue C(22a), and the relationship between the distance r(32c) between hue C(32c) and origin O and the distance r(22c) between hue C(22c) and origin O may be equivalent to the relationship between the distance r(32a) between hue C(32a) and origin O and the distance r(22a) between hue C(22a) and origin O.

Figure 8:
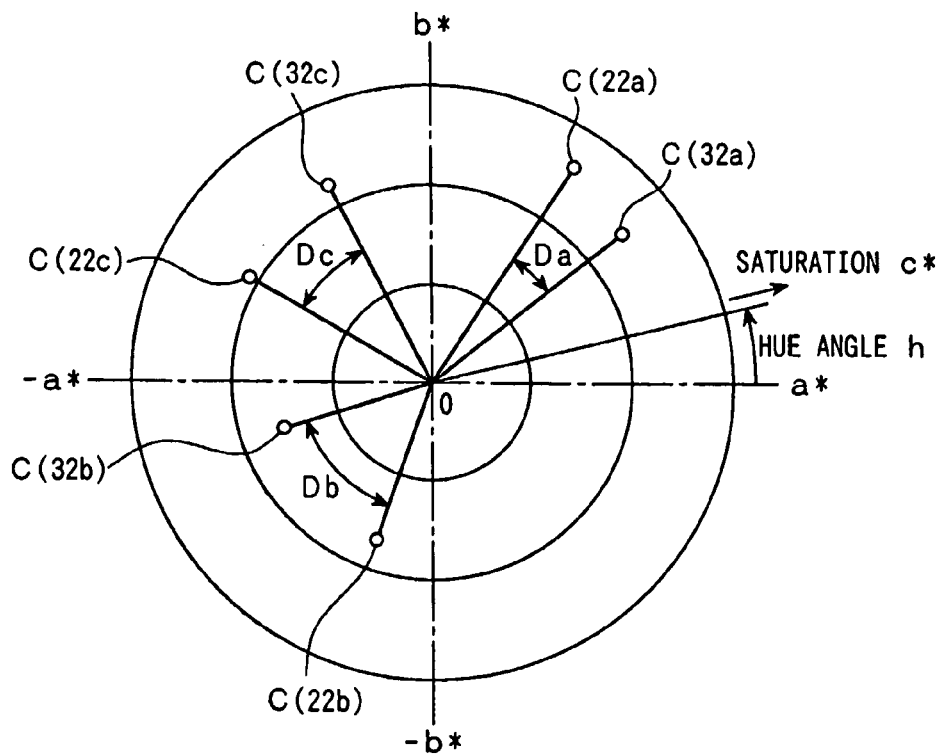
FIG. 8 is a diagram showing another correction by the correction part in another modification of the embodiment 1.

FIG. 8 shows another correction by the correction part. Supposing that only the feature colors 22a and 32a, and the feature colors 22b and 32b are associated, the correction part 16 corrects the hue C(32a) in the domain 32a into the hue C(22a), the hue C(32b) into the hue C(22b), and further the hue C(32c) into the hue C(22c) by weighting the first relationship between hue C(32a) and hue C(22a) and the second relationship between hue C(32b) and hue C(22b) depending on a difference in color value between hue C(32c) and hue C(32a) and a difference in color value between hue C(32c) and hue C(32b) in the color specification system L*a*b*, as shown in FIG. 8.

The same effects are obtained as above by not operating the amount of L* strongly related to shading but operating the amount of c*, h* mostly related to the tint in the L*c*h* color specification system, instead of operating the amount of a*, b* in the color specification system L*a*b* as above.

Herein, an image processing apparatus of this embodiment has the same configuration as shown in FIG. 1 for the embodiment 1, and will be described below by referring to FIG. 1 again. In this embodiment, the first image 20a and the second image 30a of the embodiment 1 in FIG. 2 correspond to the first image 20a and the second image 30a as shown in FIGS. 9A and 9B. Accordingly, in this embodiment, in FIGS. 9A and 9B, 10A and 10B, 12 and 13A to 13C, the same signs as in the embodiment 1 may designate different parts from those of the embodiment 1. Also, in this embodiment, FIG. 11 is a flowchart showing the operation of the image processing apparatus 10 of FIG. 4 in the embodiment 1.

<Configuration>

Figure 10B:
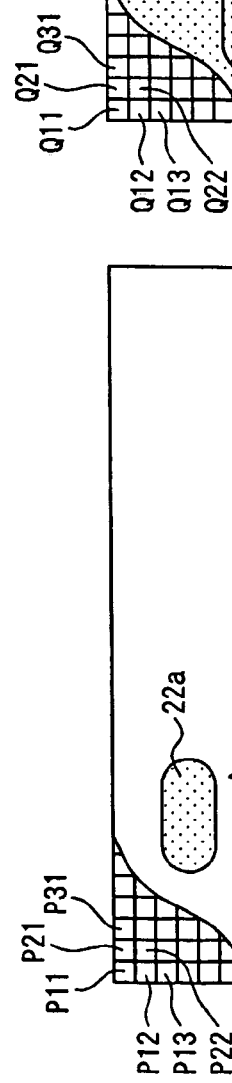
FIGS. 10A and 10B are views showing two images after processing by the image processing apparatus of the embodiment 2.
Figure 10A:
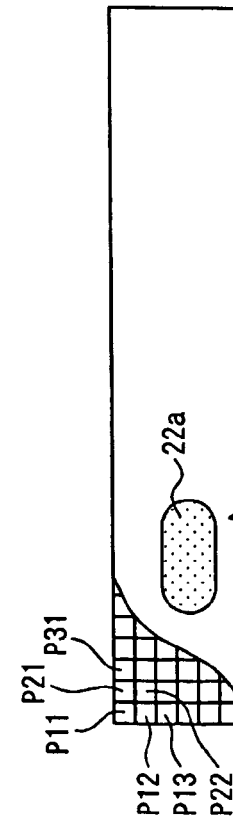
Figure 11:
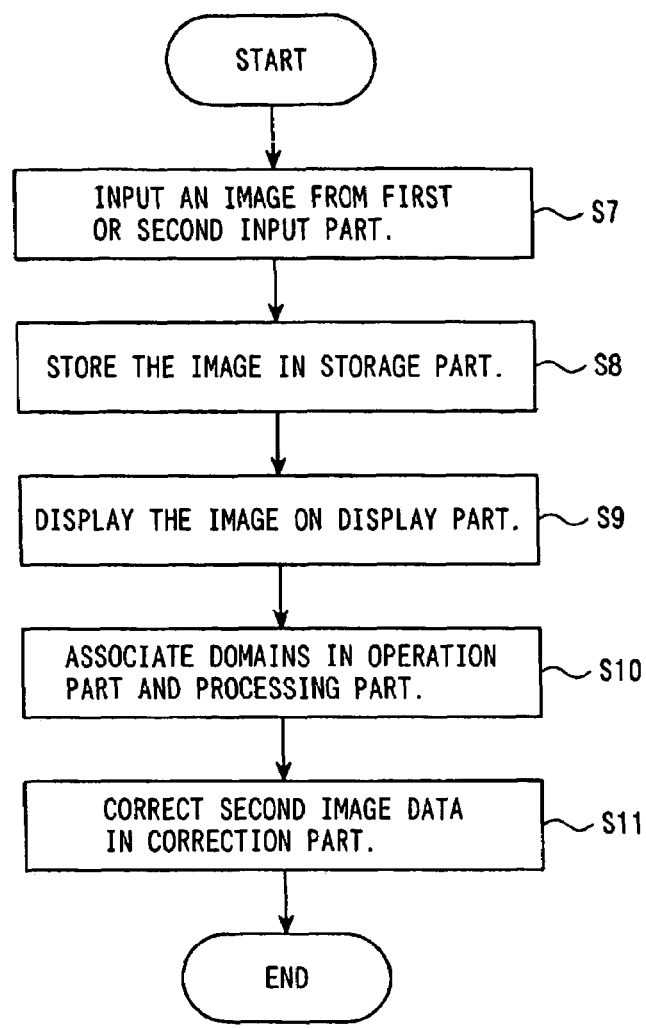
FIG. 11 is a flowchart showing the operation of the image processing apparatus of the embodiment 2.

FIGS. 9A and 9B show two images before processing by the image processing apparatus of this embodiment, and FIGS. 10A and 10B show two images after processing by the image processing apparatus of this embodiment. The image processing apparatus 10 of this embodiment comprises a first input part 11, a second input part 12, an operation part 13, a storage part 14, a processing part 15, a correction part 16, a display part 17 and a printing part 18 to correct the second image 30a by referring to the first image 20a.

The first input part 11 may be a scanner, for example, for scanning the print contents printed on a print medium such as a print sheet and reading them in digital format to produce the first image data 20b representing the read first image 20a.

The second input part 12 may be a digital camera, for example, for picking up an image of the subject such as substance to produce the second image data 30b representing the taken second image 30a in the same way as above.

Though in this embodiment, the first input part 11 and the second input part 12 are integrated, together with the other parts 13 to 18, into the image processing apparatus 10, the first input part 11, the second input part 12 and the other parts (13 to 18) may be constituted separately.

As shown in FIGS. 9A and 9B, the first image 20a is composed of plural pieces of pixel data P11 to Pmn (m, n is an integer of two or greater) and the second image 30a is composed of plural pieces of pixel data Q11 to Qmn. Each of the pixel data P11 to Pmn and Q11 to Qmn has the color information indicating three elements of color, or the hue, saturation and lightness. Also, the first image 20a is composed of the objects 21a, 21b, 21c and 21d such as sky, ground and tree, for example, and the second image 30a is also composed of the objects 31a, 31b, 31c and 31d.

Returning to FIG. 1, the operation part 13 acting as the specification part may be a mouse or a keyboard, for example, which is employed to perform an operation required to correct the first and second images 20a and 30a. The operation part 13 may be employed to specify a domain to associate the domains 22a to 22d of the first image 20a and the domains 32a to 32d of the second image 30a, as shown in FIGS. 9A and 9B.

More particularly, the operation part 13 may be employed, for the first image 20a and the second image 30a, to specify the position, shape and size of the domains 22a, 32a by any drawing to associate a desired domain 22a of the first image 20a and a desired domain 32a of the second image 30a, as shown in FIGS. 9A and 9B. Similarly, the operation part 13 may be employed to specify other desired domains 22b, 22c and 22d of the first image 20a and other desired domains 32b, 32c and 32d of the second image 30a. In the following, the information indicating the representative color of each of the domains 22a to 22d and 32a to 32d is referred to as "domain representative color information".

Returning to FIG. 1, the storage part 14 may be a storage medium such as a hard disk or a flexible disk, which is employed to store the first image data 20b produced by the first input part 11 and the second image data 30b produced by the second input part 12. The storage part 14 also stores a program 19 for causing the image processing apparatus 10 to perform the image processing for the first and second images 20a and 30a.

The processing part 15 may be a CPU (Central Processing Unit), for example, to control the overall operation of the image processing apparatus 10, and define the domain representative color information of the domains 22a to 22d and 32a to 32d.

The correction part 16 may be a CPU, like the processing part 15, which corrects the hue of the second image 30a in accordance with the hue relationship between one domain 22a and one domain 32a specified by the operation part 13.

The display part 17 may be a liquid crystal display or a CRT (Cathode Ray Tube) display, and displays the first image 20a and the second image 30a before and after correction, as shown in FIGS. 9A and 9B, and 10A and 10B.

The printing part 18 may be an ink jet printer, for example, and prints the first image 20a and the second image 30a before and after correction, like the display part 17, as shown in FIGS. 9A and 9B, and 10A and 10B.

<Operation>

FIG. 11 is a flowchart showing the operation of the image processing apparatus of the embodiment 2. The operation of the image processing apparatus of the embodiment 2 will be described below along with the flowchart of FIG. 11. Herein, the program 19 in this embodiment comprises a first specification step and a second specification step corresponding to step S10 of FIG. 11 and a correction step corresponding to step S11 of FIG. 11.

Step S7: The first input part 11 reads the image 20a as shown in FIG. 9A by scanning it to produce the first image data 20b representing the contents of the image 20a. Subsequently, the second input part 12 picks up an image of the subject to produce the second image data 30 representing the second image 30a acquired as a result, as shown in FIG. 9B.

Step S8: The first and second input parts 11, 12 output the first and second image data 20b, 30b to the storage part 14, which stores the first and second image data 20b, 30b.

Step S9: The processing part 15 reads the first and second image data 20b, 30b stored in the storage part 14 from the storage part 14, and displays them on the display part 17.

Step S10: The user specifies any domain of the first image 20a, for example, domain 22a, using the operation part 13 and any domain of the second image 30a, for example, domain 32a (these specified domains 22a, 32a are hereinafter referred to as "specified domain 22a" and "specified domain 32a"), using the operation part 13, thereby associating the specified domain 22a and the specified domain 32a. Herein, when the user specifies the domain by operating the operation part 13, the processing part 15 prompts the user to specify any domain of the first or second image 20a, 30a by displaying a message or the like.

Step S11: The correction part 16 corrects the second image data 30b in accordance with the correspondence relation between domain 22a and domain 32a. Herein, the correction part 16 adjusts the hue of the entire second image 30a, or provides the entire second image 30a with "spot", as shown in FIG. 10B, based on the relationship between hue of the domain 22a before correction (hue abstracted by "spot") and hue of the domain 32a before correction (hue abstracted by "solid color"), i.e., the correspondence relation between "spot" and "solid color", as shown in FIGS. 9A and 9B.

Figure 12:
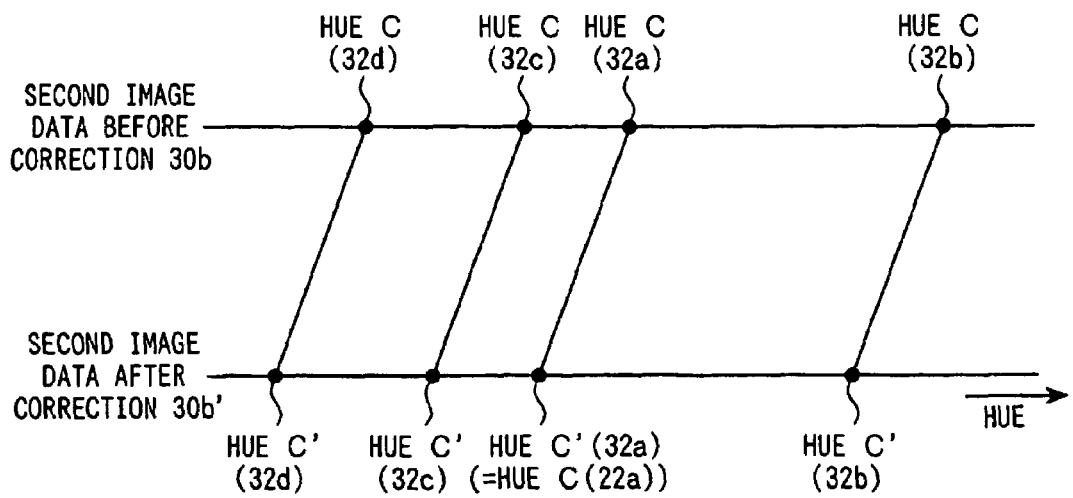
FIG. 12 is a diagram showing the correction by the correction part of the embodiment 2.

FIG. 12 shows the correction by the correction part. As shown in FIG. 12, the correction part 16 corrects the hue of the second image 30a before correction into the second image data 30b' after correction representing the corrected second image 30a as shown in FIG. 10B. More particularly, the correction part 16 corrects the hue C(32a), C(32b), C(32c) and C(32d) that are the domain representative color information of the specified domain 32a, domain 32b, domain 32c and domain 32d in the second image data 30b into the hue C'(32a), C'(32b), C'(32c) and C'(32d), based on the relationship between the hue C(32a) of the specified domain 32a in the second image data 30b before correction and the hue C'(32a) after correction that is the hue C(22a) of the specified domain 22a in the first image data 20b, and additionally corrects other range than the specified domain 32a and domains 32b to 32d in the same way. Briefly, the correction part 16 corrects the hue of the entire second image 30a, based on the hue relation between the hue C(32a) of the specified domain 32a and the hue C(22a) of the specified domain 22a.

<Effects>

With the image processing apparatus 10 of the embodiment 2 as described above, the correction part 16 corrects the hue C(32a) that is the domain representative color information of the specified domain 32a specified by the operation part 13 into the hue C(22a) or hue C'(32a) that is the domain representative color information of the specified domain 22a corresponding to the domain, and additionally corrects the hue C(32b), C(32c) and C(32d) that are the domain representative color information of other domains 32b to 32d into the hue C'(32b), C'(32c) and C'(32d), thereby correcting the hue of the entire second image 30a, whereby it is possible to make the correction without inputting the technical parameters as conventionally needed.

In the image processing apparatus of the embodiment 2 as described above, the same effects are obtained by directly specifying the color itself in the first and second images 20a, 30a in making the correction, instead of specifying the color of the domain 22a, 32a or the color defined by the domain representative color information in the site or range such as domains 22a, 32a in the first and second images 20a, 30a.

Modification 1 of Embodiment 2

Instead of one set of domains 32a, 22a as specified above, two or more sets of domains, for example, domains 32a and 22a and domains 32b and 22b, may be specified, in which the hue C(32c) that is the domain representative color information of domain 32c is corrected by weighting the first relationship between domain 32a and domain 22a, and the second relationship between domain 32b and domain 22b depending on a difference in the domain representative color information between domain 32c and domain 32a for the domain 32c, or difference in the color value, and a difference in the domain representative color information between domain 32c and domain 32b, or difference in the color value, thereby achieving the same effects as above. Herein, the "color value" is the numerical value representing the conceptual chromaticity in the coordinate.

Modification 2 of Embodiment 2

The above correction may be made differently by weighting depending on the number of sets of the specified domains (e.g., domains 32a and 32b), instead of depending on the difference in color value as in the modification 1, or more particularly, the hue may be corrected by one conventionally known correction method when specifying one set of domains and by another conventionally known correction method when specifying two sets of domains, thereby achieving the same effects as above.

Modifications 3, 4 and 5 of Embodiment 2

Figure 13A:
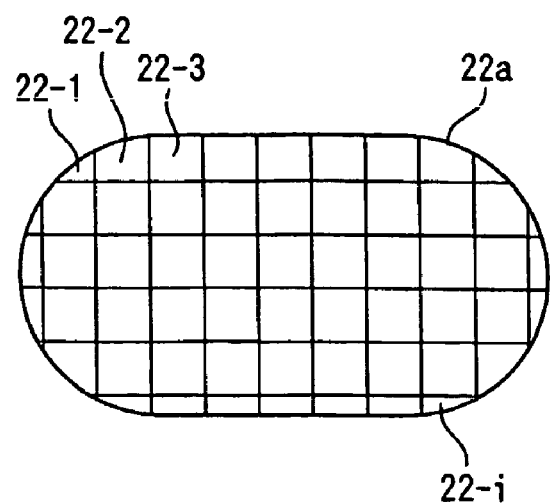
FIGS. 13A to 13C are views showing the areas in the modifications 3, 4 and 5 of the embodiment 2.
Figure 13B:
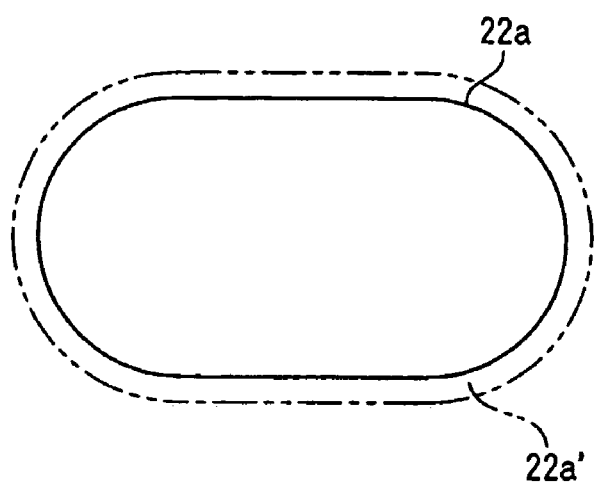
Figure 13C:
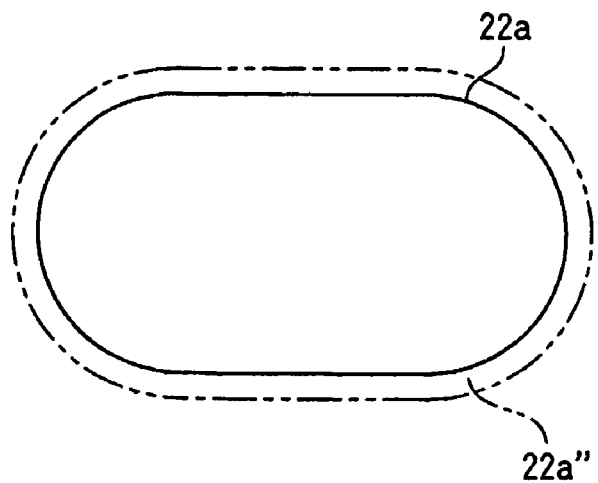

FIGS. 13A to 13C show three domains in the modifications 3, 4 and 5. In a modification 3, the domain 22a is composed of plural small domains 22-1, 22-2, 22-3, . . . , 22-*i* (i is any integer), that are equivalent to the pixel data P11 to Pmn, as shown in FIG. 13A. The processing part 15 accurately decides the domain representative color information of domain 22*a*, from the viewpoint of average, median and mode, employing the small domain representative color information that are the color information of plural small domains 22-1 to 22-*i*.

The processing part 15 defines the domain representative color information of domain 22*a* in terms of the small domain representative color information of one or more small domains among the plural small domains 22-1 to 22-*i*. More specifically, the processing part 15 defines it in terms of the small domain representative color information of one or more small domains having the highest percentage of area occupied in the domain 22*a* among the plural small domains 22-1 to 22-*i*. More desirably, the processing part 15 defines it in terms of the small domain representative color information of small domains of which the percentage of area occupied in the domain 22*a* is greater than or equal to a predetermined rate (one-third or half, etc.). The processing part 15 defines other domains 22*b* to 22*d* and 32*a* to 32*d* in the same way.

In a modification 4, the processing part 15 may define the domain representative color information of the domain 22*a* in terms of the neighboring domain representative color information that is the color information representing both the domain 22*a* and the neighboring domain 22*a'* in the neighborhood of the domain 22*a* that is defined by the contour line (broken line) apart a certain distance from the contour line (solid line) of the domain 22*a*, as shown in FIG. 13B.

In a modification 5, the processing part 15 may define the domain representative color information of the domain 22*a* in terms of the equivalent domain representative color information that is the color information representing both the domain 22*a* and the equivalent domain 22*a''*, which is considered as substantially equivalent to the domain 22*a* from the viewpoint of the color, for example, hue, saturation and lightness, as shown in FIG. 13C.

Embodiment 3

<Configuration>

An image processing apparatus of this embodiment will be described below. The image processing apparatus of this embodiment has the same configuration as shown in FIG. 1 for the embodiment 3, but has a different way of correction from the embodiment 2.

Figure 14B:
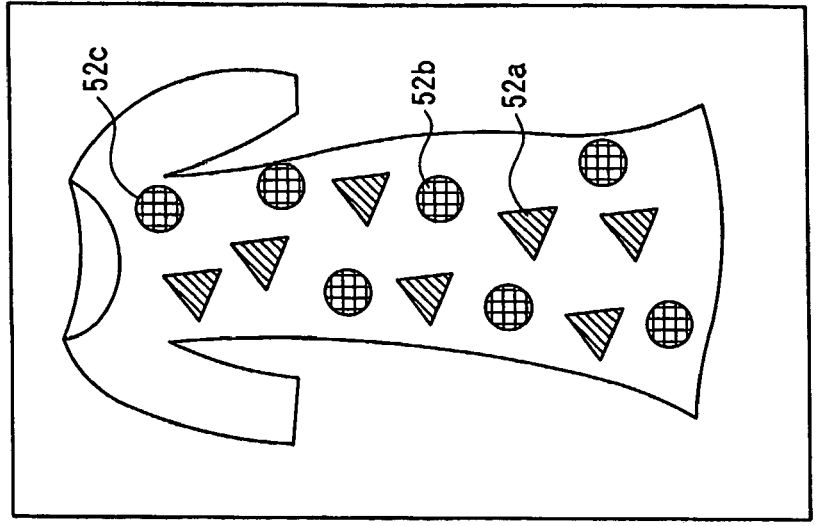
FIGS. 14A and 14B are views showing two images processed by an image processing apparatus of an embodiment 3.
Figure 14A:
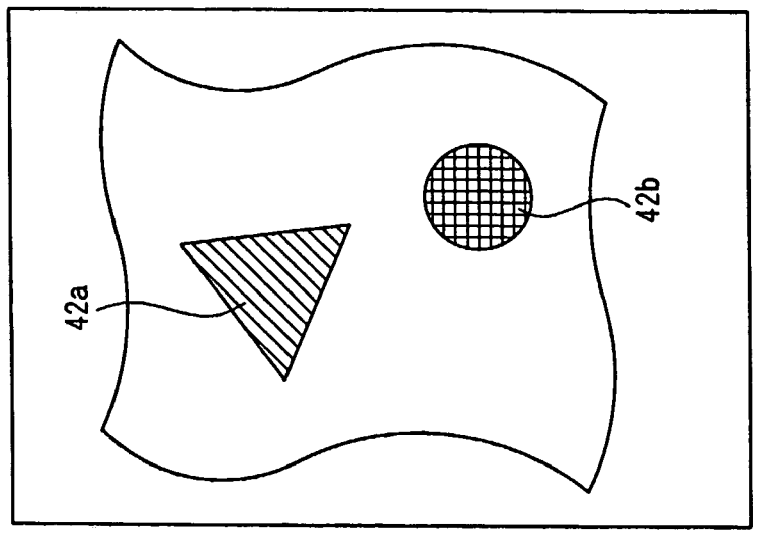

FIGS. 14A and 14B show two images processed by the image processing apparatus in the embodiment 3. The image processing apparatus of this embodiment processes a first image 40*a* and a second image 50*a* as shown in FIG. 14A, instead of the first image 20*a* and the second image 30*a* as shown in FIGS. 9A and 9B. The first image 40*a* is inputted from the first input part 11 that is a scanner, and the second image 50*a* is inputted from the second input part 12 that is a digital camera. The input by the scanner has high reliability and stability in the color of the input first image 40*a* because the conditions for its light source and background are fixed, whereas the input by the digital camera has low reliability and stability in the color of the input second image 50*a* because the conditions for its light source and background are not fixed. The image processing apparatus of the embodiment 3 performs the same processings as at steps S7 to S10 of FIG. 11, and at step S11, corrects the second image 50*a* with reference to the first image 40*a*, like the embodiment 2, but in a different way from the correction of the embodiment 2.

<Operation>

Figure 15:
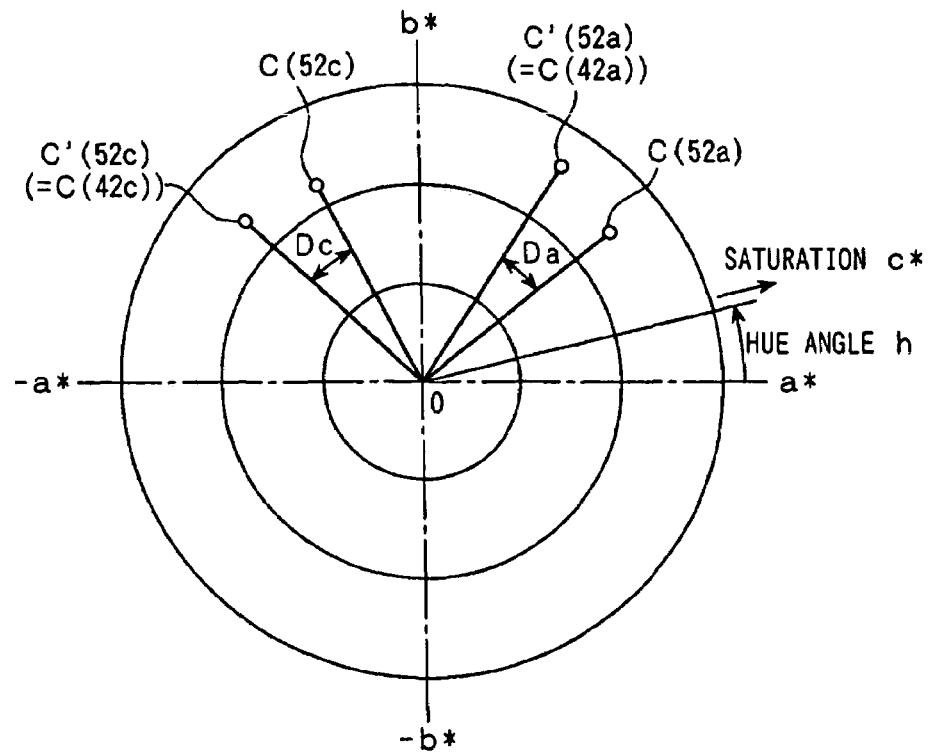
FIG. 15 is a diagram showing the correction by the correction part of the embodiment 3.

FIG. 15 shows the correction by the correction part. For the first image 40*a* and the second image 50*a* in the embodiment 3 as shown in FIGS. 14A and 14B, like the first image 20*a* and the second image 30*a* in the embodiment 2, the domains 42*a*, 42 band 52*a* to 52*c* can be specified by the operation part 13. The processing part 15 associates the domain 42*a* and the domain 52*a*, and the domain 42*b* and the domain 52*b*.

The correction part 16 corrects the hue C(52*a*) that is the domain representative color information of the domain 52*a* into the hue C'(52*a*) that is the hue C(42*a*) of the domain 42*a*, and additionally corrects the hue C(52*c*) of the domain 52*c* into the hue C'(52*c*) in accordance with the relationship between hue C(52*a*) and hue C'(52*a*) in the conventionally well-known color specification system L*a*b* of the CIE (International Lighting Commission), as shown in FIG. 15. More particularly, the correction part 16 corrects the hue C(52*c*) into the hue C'(52*c*) so that the angle Dc between hue C(52*c*) and hue C'(52*c*) may be equal to the angle Da between hue C(52*a*) and hue C'(52*a*), and the relationship between the distance r (52*c*) between hue C(52*c*) and origin O and the distance r'(52*c*) between hue C'(52*c*) and origin O may be equivalent to the relationship between the distance r(52*a*) between hue C(52*a*) and origin O and the distance r'(52*a*) between hue C'(52*a*) and origin O.

Figure 16:
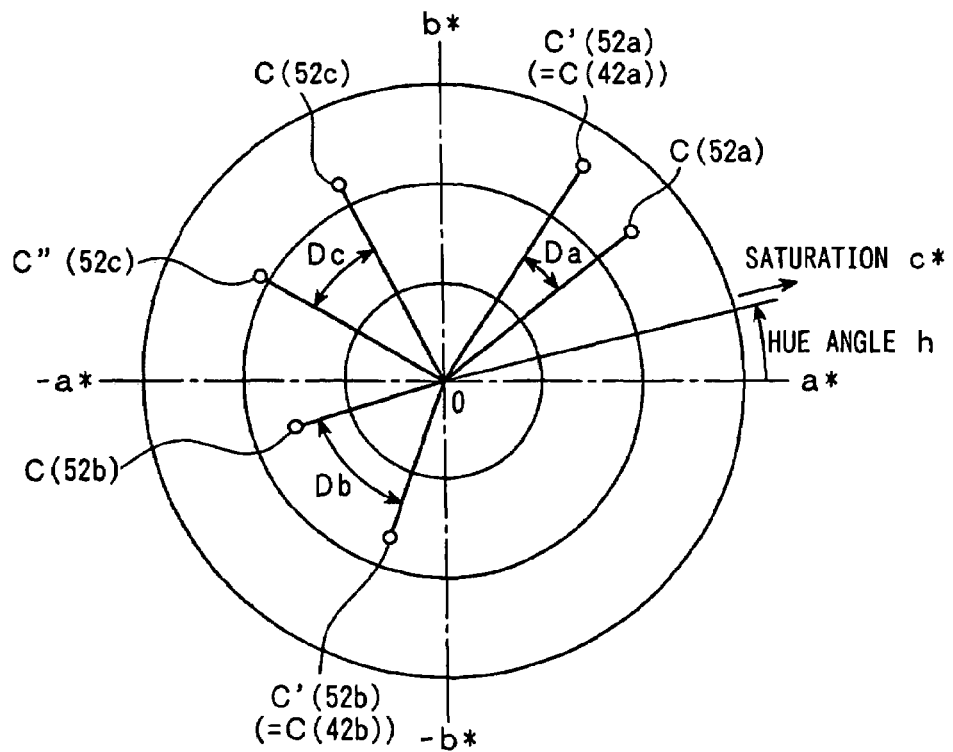
FIG. 16 is a diagram showing another correction by the correction part of the embodiment 3.

FIG. 16 shows another correction by the correction part. The correction part 16 corrects the hue C(52*a*) of the domain 52*a* into the hue C'(52*a*) that is the hue C(42*a*) of the domain 42*a*, corrects the hue C(52*b*) of the domain 52*b* into the hue C'(52*b*) that is the hue C(42*b*) of the domain 42*b*, and corrects the hue C(52*c*) into the hue C''(52*c*) in accordance with the first relationship between hue C(52*a*) and hue C'(52*a*) and the second relationship between hue C(52*b*) and hue C'(52*b*) in the color specification system L*a*b*, as shown in FIG. 16. More specifically, the correction part 16 corrects the hue C(52*c*) into the hue C''(52*c*) by weighting the first relationship and the second relationship depending on a difference in the color value between hue C(52*c*) and hue C(52*a*) and a difference in the color value between hue C(52*c*) and hue C(52*b*) and reflecting them to the correction.

<Effects>

With the image processing apparatus of the embodiment 3 as described above, the second image 50*a* inputted from the second input part 12 that is the digital camera is corrected on the basis of the first image 40*a* inputted from the first input part 11 that is the scanner in the color specification system L*a*b*, whereby the second image 50*a* can be corrected without inputting the composite parameters for image processing more easily than conventionally.

It may be possible to define the chromaticity in the coordinate in a YUV color specification system, or in a color space of the system in which the color is represented in terms of the information of brightness signal (Y), difference (U) between brightness signal and red component, and difference (V) between brightness signal and blue component, instead of defining the hue in the color value of coordinate in the color space such as the color specification system L*a*b*.

Figure 17A:
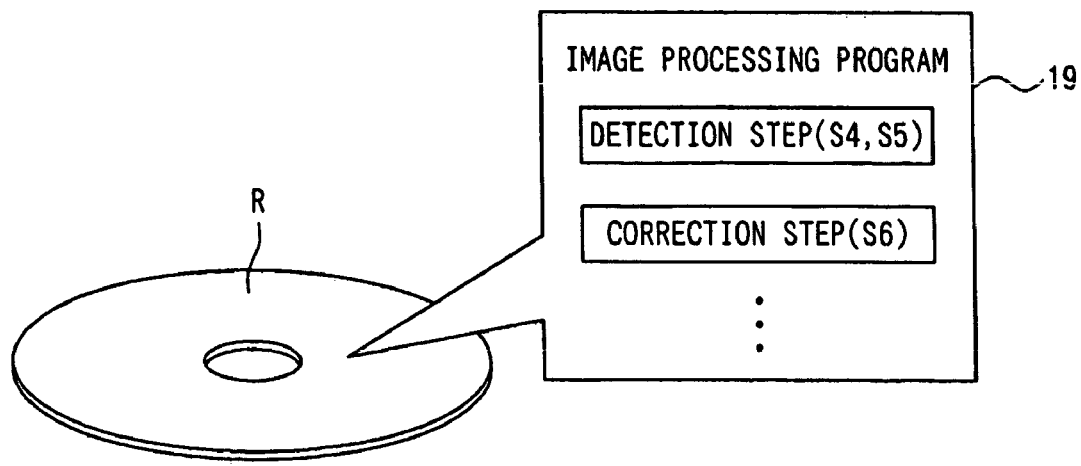
FIGS. 17A and 17B are concept diagrams showing one example of a computer readable recording medium where an image processing program 19 is recorded.
Figure 17B:
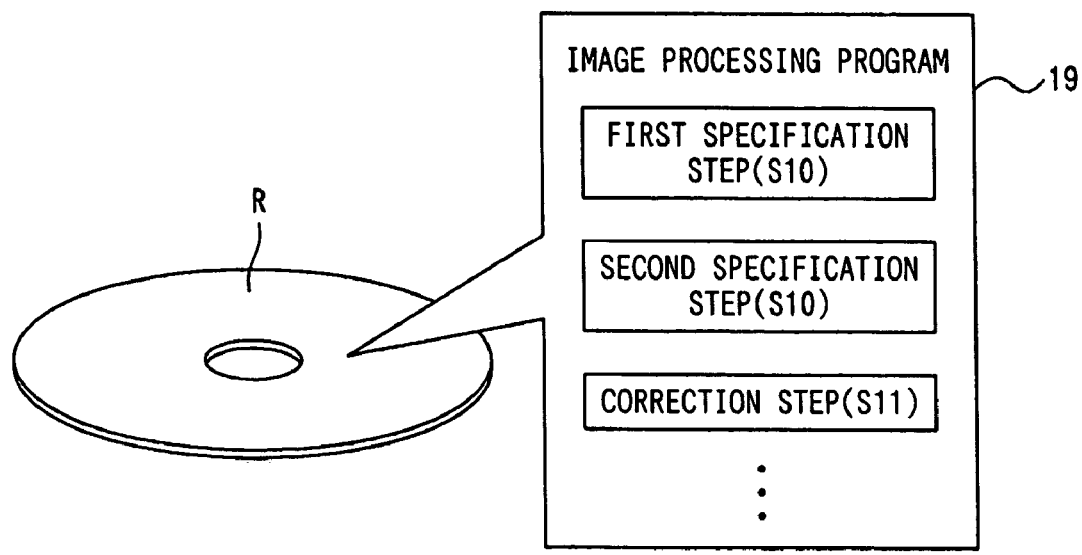

FIGS. 17A and 17B show the CD-ROM (or DVD-ROM) that is one of storage media R1 and R2 readable by the computer. An image processing program 19 of the embodiment 1 to implement the present invention is stored in this storage medium R1, and an image processing program 19 of the embodiment 2 to implement the present invention is stored in this storage medium R2. The image processing program 19 can be easily provided via the computer readable storage medium R1 or R2 such as CD-ROM or DVD-ROM to the user desiring the image processing program 19.

The invention claimed is:

1. An image processing method utilizing a computer to perform the steps of:
a detection step comprising:
detecting a correspondence between one color of a first plurality of colors in a first image and one color of a second plurality of colors in a second image,
detecting a plurality of correspondences between a first plurality of feature colors and a second plurality of feature colors by extracting said first plurality of feature colors featuring said first image from said first image and extracting said second plurality of feature colors featuring said second image from said second image,
making a first decision of deciding said first plurality of feature colors in accordance with an extent of appearance of said first plurality of colors, and
making a second decision of deciding said second plurality of feature colors in accordance with an extent of appearance of said second plurality of colors; and
a correction step of correcting said first plurality of colors or said second plurality of colors in accordance with said correspondence.

2. The image processing method utilizing a computer according to claim 1, wherein said detection step comprises making said first decision in accordance with the extent of appearance of a third plurality of colors over a predetermined extent of appearance among said first plurality of colors, and making said second decision in accordance with the extent of appearance of a fourth plurality of colors over a predetermined extent of appearance among said second plurality of colors.

3. The image processing method utilizing a computer according to claim 1, wherein said detection step comprises detecting said plurality of correspondences so that a sum of color differences between feature colors corresponding to each other may be minimized for possible combinations of said first plurality of feature colors and said second plurality of feature colors.

4. The image processing method utilizing a computer according to claim 3, wherein said detection step comprises weighting said color differences and said extents of appearance, and calculating a weighted sum of color differences and a weighted sum of extents of appearance.

5. The image processing method utilizing a computer according to claim 1, wherein said detection step comprises detecting said plurality of correspondences by pattern matching of the color histogram.

6. The image processing method utilizing a computer according to claim 1, wherein said correction step comprises correcting the other colors with reference to one of said first plurality of colors and said second plurality of colors.

7. The image processing method utilizing a computer according to claim 1, wherein said correction step comprises correcting at least one of hue, saturation and lightness based on a color specification system of hue, saturation and lightness.

8. The image processing method utilizing a computer according to claim 1, wherein said detection step comprises extracting said feature colors based on a predetermined domain, or a domain specified by the user.

9. An image processing apparatus comprising:
a detection part that detects a correspondence between one color of a first plurality of colors in a first image and one color of a second plurality of colors in a second image, detects a plurality of correspondences between a first plurality of feature colors and a second plurality of feature colors by extracting said first plurality of feature colors featuring said first image from said first image and extracting said second plurality of feature colors featuring said second image from said second image, decides said first plurality of feature colors in accordance with an extent of appearance of said first plurality of colors, and decides said second plurality of feature colors in accordance with an extent of appearance of said second plurality of colors; and
a correction part that corrects said first plurality of colors or said second plurality of colors in accordance with said correspondence.

10. The image processing apparatus according to claim 9, further comprising a first input part for inputting said first image, and a second input part for inputting said second image.

11. The image processing apparatus according to claim 10, wherein said first input part is one of a scanner and a digital camera, and said second input part is the other of said scanner and said digital camera.

12. The image processing apparatus according to claim 9, wherein said correction part corrects the other colors with reference to one of said first plurality of colors and said second plurality of colors.

13. The image processing apparatus according to claim 9, wherein said correction part corrects at least one of said hue, said saturation and said lightness based on a color specification system of hue, saturation and lightness.

14. The image processing apparatus according to claim 9, wherein said detection part extracts said feature colors based on a predetermined range or a range specified by the user.

15. A computer-readable storage medium storing an image processing program for enabling a computer to perform an image processing, said computer having a detection part and a correction part which cooperate to perform the image processing, said program comprising:
a detection step comprising:
causing said detection part to detect a correspondence between one color of a first plurality of colors in a first image and one color of a second plurality of colors in a second image,
detecting a plurality of correspondences between a first plurality of feature colors and a second plurality of feature colors by extracting said first plurality of feature colors featuring said first image from said first image and extracting said second plurality of feature colors featuring said second image from said second image,
making a first decision of deciding said first plurality of feature colors in accordance with the extent of appearance of said first plurality of colors, and
making a second decision of deciding said second plurality of feature colors in accordance with the extent of appearance of said second plurality of colors; and
a correction step of causing said correction part to correct said first plurality of colors or said second plurality of colors in accordance with said correspondence.

16. A computer readable storage medium storing an image processing program for enabling a computer to perform an image processing, said computer having a detection part and a correction part which cooperate to perform the image processing, said program comprising:
a detection step of causing said detection part to detect a correspondence between one color of a first plurality of colors in a first image and one color of a second plurality of colors in a second and image and to detect a plurality of correspondences between a first plurality of feature colors and a second plurality of feature colors by extracting said first plurality of feature colors featuring said first image from said first image and extracting said second plurality of feature colors featuring said second image from said second image;

a first deciding step of deciding said first plurality of feature colors in accordance with the extent of appearance of said first plurality of colors;

a second deciding step of deciding said second plurality of feature colors in accordance with the extent of appearance of said second plurality of colors; and a correction step of causing said correction part to correct said first plurality of colors or said second plurality of colors in accordance with said correspondence.

17. An image processing method utilizing a computer to perform the steps of:

a specification step of specifying the color in each of two images;

a detection step of detecting a plurality of correspondences between a first plurality of feature colors and a second plurality of feature colors by extracting said first plurality of feature colors featuring said first image from said first image and extracting said second plurality of feature colors featuring said second image from said second image;

a first deciding step of deciding said first plurality of feature colors in accordance with the extent of appearance of said first plurality of colors;

a second deciding step of deciding said second plurality of feature colors in accordance with the extent of appearance of said second plurality of colors; and a correction step of correcting the other color in one image in accordance with the relationship between said both colors.

* * * * *